United States Patent [19]
Ten Kate et al.

[11] Patent Number: 5,850,456
[45] Date of Patent: Dec. 15, 1998

[54] 7-CHANNEL TRANSMISSION, COMPATIBLE WITH 5-CHANNEL TRANSMISSION AND 2-CHANNEL TRANSMISSION

[75] Inventors: Warner R. T. Ten Kate; Leon M. Van De Kerkhof, both of Eindhoven, Netherlands

[73] Assignee: U.S. Philips Corporation, New York, N.Y.

[21] Appl. No.: 795,820

[22] Filed: Feb. 6, 1997

[30]   Foreign Application Priority Data

Feb. 8, 1996  [EP]   European Pat. Off. ............... 96200274

[51] Int. Cl.$^6$ ....................................................... H04S 3/00
[52] U.S. Cl. ................................................ 381/23; 381/18
[58] Field of Search ................................. 381/18, 23, 19, 381/22

[56]             References Cited

U.S. PATENT DOCUMENTS

| | | | |
|---|---|---|---|
| 4,620,311 | 10/1986 | Immink | 375/19 |
| 5,481,643 | 1/1996 | Ten Kate et al. | 395/2.36 |
| 5,506,907 | 4/1996 | Ueno et al. | 381/18 |
| 5,544,247 | 8/1996 | Ten Kate | 381/27 |

FOREIGN PATENT DOCUMENTS

| | | |
|---|---|---|
| 0400755 | 12/1990 | European Pat. Off. . |
| 0402973 | 12/1990 | European Pat. Off. . |
| 0457390 | 11/1991 | European Pat. Off. . |
| 0457391 | 11/1991 | European Pat. Off. . |
| 0497413 | 8/1992 | European Pat. Off. . |

OTHER PUBLICATIONS

"A New Surround–Stereo–Surround Coding Technique" W. Ten Kate et al, J. Audio Eng. Soc. vol. 40, No. 5, May 1992, pp. 376–382.
Matrix of Bit Rate Reduced Audio Signals, W.R. Ten Kate et al, Proc. of the ICASSP, 1992, Mar. 23–26, pp. II–205—II–208.
ISO/IEC International Standard is 11172–3, Information Technology–Coding of Moving Pictures and Associated Audio for Digital Storage Mediu up to about 1.5 Mbits/part 3: Audio.
ISO/IEC International Standard IS 13818–3, Information Technology–coding of Moving Pictures and Associated Audio, Part 3: Audio.

*Primary Examiner*—Forester W. Isen
*Attorney, Agent, or Firm*—Michael E. Belk

[57]             ABSTRACT

Figure 2:
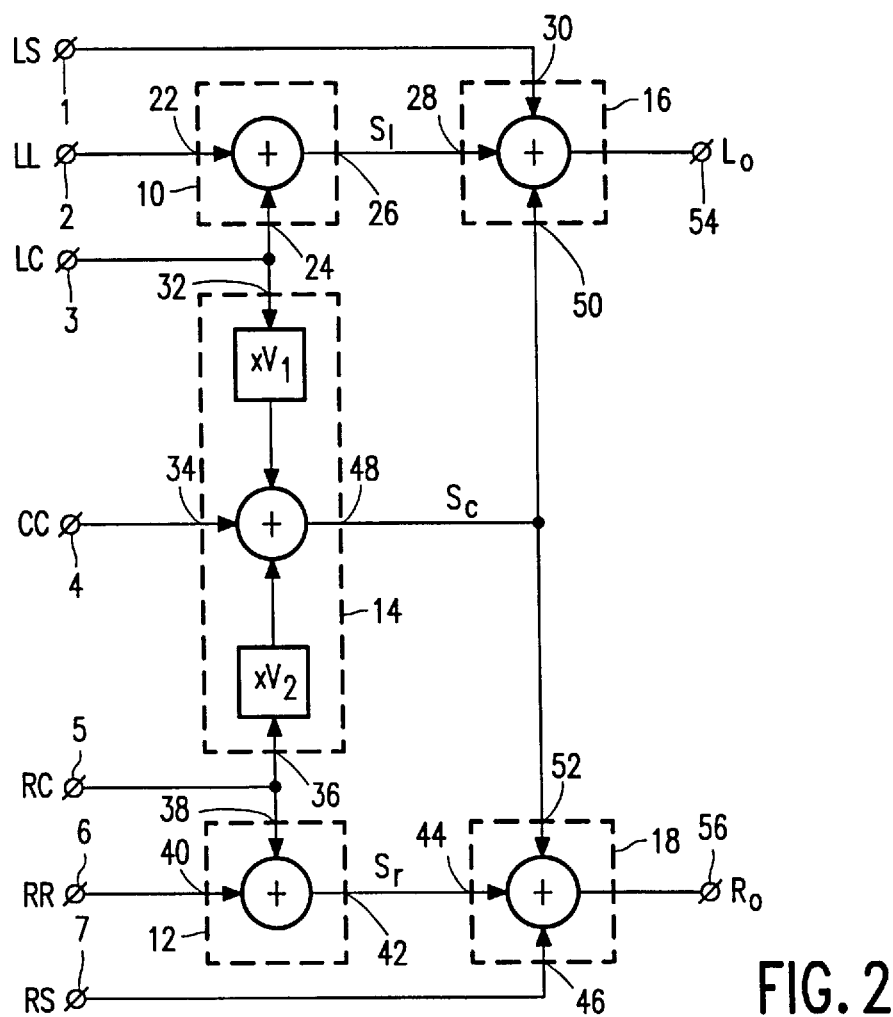

A 7-channel encoder and corresponding decoder is disclosed for encoding a 7-channel signal into a transmission signal which is backwards compatible, so that prior art MPEG-1 2-channel decoders are capable of decoding the transmission signal into a compatible stereo signal, prior art MPEG-2 5-channel decoders are capable of decoding the transmission signal into a compatible 5-channel signal. Further, a 7-channel decoder is disclosed for decoding the transmission signal into a 7-channel signal. (FIG. 2).

24 Claims, 13 Drawing Sheets

7-CHANNEL TRANSMISSION, COMPATIBLE WITH 5-CHANNEL TRANSMISSION AND 2-CHANNEL TRANSMISSION

The invention relates to an encoder apparatus for encoding a plurality of digital information signals into a transmission signal, to a method for encoding the plurality of digital information signals and to a decoder apparatus for decoding the transmission signal so as to regenerate replicas of the plurality of digital information signals. An encoder apparatus in accordance with the opening paragraph is known from EP 678,226 A1, which is document (8) in the list of related documents at the end of this description.

Matrixing can be carried off when transmitting a first main signal component (the left hand signal component L of a stereo signal), a second main signal component (the right hand signal component R) and an auxiliary component (a central signal component C), such that a first composite signal component $L_0$ is obtained which equals L+a.C and a second composite signal $R_0$ is obtained which equals R+a.C, and where the signals $L_0$, $R_0$ and C are transmitted. Upon reception by a standard receiver not being provided with a corresponding dematrixing circuit, the signal components $L_0$ and $R_0$ are used for supplying via two stereo loudspeakers to a listener. The listener is thus able to perceive the C component transmitted as well, although he has a standard receiver.

More sophisticated matrixing schemes are discussed in J.A.E.S., Vol. 40, No. 5, May 1992, pp. 376–382, as well as in the publication 'Matrixing of bitrate reduced audio signals' by W. R.Th. ten Kate et al, in Proc. of the ICASSP, 1992, Mar. 23–26, San Francisco, Vol.2, pp. II-205 to II-208, documents (1a) and (1b) in the list of references, as well as document (8).

They all satisfy the requirement that, even if a 4-channel (R, L, C and S) signal, or a 5-channel (L, R, C, LS, RS) signal is transmitted, the transmitted signal can be decoded by a standard stereo receiver.

Compression means for bit rate reducing a signal has been described in published European patent applications 457,390A1 (PHN 13.328) and 457,391A1 (PHN 13.329), the documents (7a) and (7b) respectively in the list of references. Further, reference is made to two ISO/IEC MPEG-1 and MPEG-2 standard documents, the documents (9) and (10) respectively in the list of related documents.

The invention aims at providing further improvements to an encoder apparatus for encoding a plurality of information signals.

In accordance with the invention, the apparatus for encoding a plurality of digital information signals, having first input means for receiving a first digital information signal, second input means for receiving a second digital information signal, third input means for receiving a third digital information signal, fourth input means for receiving a fourth digital information signal, fifth input means for receiving a fifth digital information signal, sixth input means for receiving a sixth digital information signal, seventh input means for receiving a seventh digital information signal, matrixing means for generating a first and a second digital composite signal from the first to seventh digital information signals, the matrixing means comprising:

first signal combination means for combining the second and third digital information signal and being adapted to generate a first combination signal, second signal combination means for combining the fifth and sixth digital information signal so as to obtain a second combination signal, third signal combination means for combining the third, fourth and fifth digital information signals so as to obtain a third combination signal, fourth signal combination means for combining the first digital information signal and the first and third combination signal so as to obtain the first composite signal, fifth signal combination means for combining the seventh digital information signal and the second and third combination signal so as to obtain the second composite signal, the apparatus further comprising:

first and second data compression means for data compressing the first and second composite signal so as to obtain first and second data reduced digital composite signals, selection means for selecting one signal from a first group of five information signals so as to obtain a first auxiliary signal, said first group of five information signals comprising said first and seventh digital information signals and said first, second and third combination signals, for selecting another one of said first group so as to obtain a second auxiliary signal and again another one of said first group so as to obtain a third auxiliary signal, the selection means further being adapted to select one signal from a second group of five information signals so as to obtain a fourth auxiliary signal, said second group of five signals comprising said second to sixth digital information signals and to select another one of said second group so as to obtain a fifth auxiliary signal, third, fourth, fifth, sixth and seventh data compression means for data compressing the first, second, third, fourth and fifth auxiliary signal respectively so as to obtain first, second, third, fourth and fifth data reduced auxiliary signals respectively, formatting means for combining the first and second data reduced composite signals and the first, second, third, fourth and fifth data reduced auxiliary signals into a transmission signal suitable for transmission via a transmission medium.

The invention is based on the following recognition. The invention resides in the objective to provide a 7-channel encoder apparatus, which is backwards compatible so as to enable not only 7-channel decoding, but also enables 5-channel decoding and 2-channel decoding using prior art MPEG-2 and MPEG-1 decoders respectively. Such encoder apparatus is meant to encode not only the five signals introduced above, namely the signals for the left front loudspeaker (from now on defined as LL loudspeaker and LL signal), the right front loudspeaker (from now on defined as RR loudspeaker and RR signal), the center loudspeaker (from now on defined as CC loudspeaker and CC signal), the left rear (surround) loudspeaker (from now on defined as LS loudspeaker and LS signal) and the right rear (surround) loudspeaker (from now on defined as RS loudspeaker and RS signal), but also two additional signals for a loudspeaker positioned between the left front loudspeaker and the center loudspeaker (from now on defined as LC loudspeaker and LC signal) and a loudspeaker positioned between the right front loudspeaker and the center loudspeaker (from now on defined as RC loudspeaker and RC signal). The encoding must be realized such that decoding by a standard stereo decoder will result in the generation by the decoder of a compatible stereo signal, that decoding by a standard 5-channel decoder will result in the generation by the decoder of a compatible 5-channel signal and that a corresponding 7-channel decoder will result in the generation by the decoder of the original seven signals supplied to the encoder.

Figure 1:
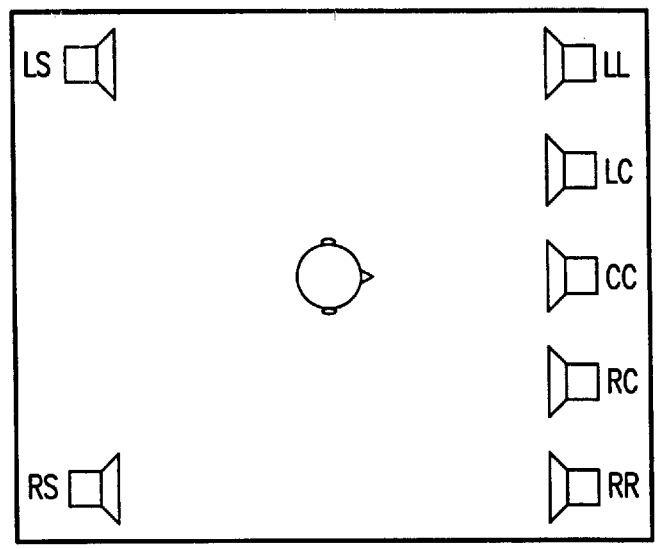

These and other aspects of the invention will be apparent from and elucidated further with reference to the embodiments described in the following figure description, in which FIG. 1 shows a room for reproducing a 7-channel information signal via seven loudspeakers positioned in that room.

Figure 3:
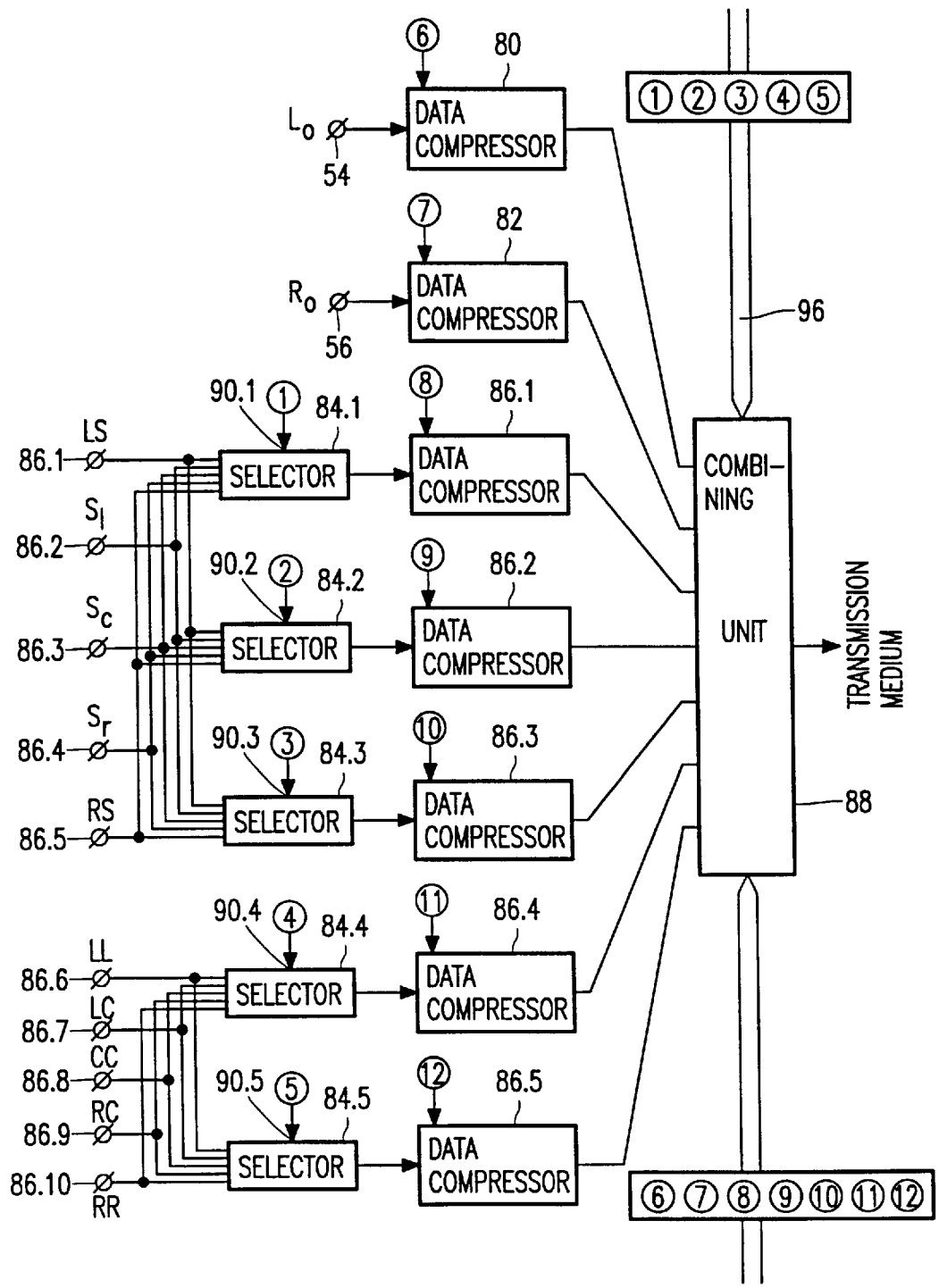
Figure 4:
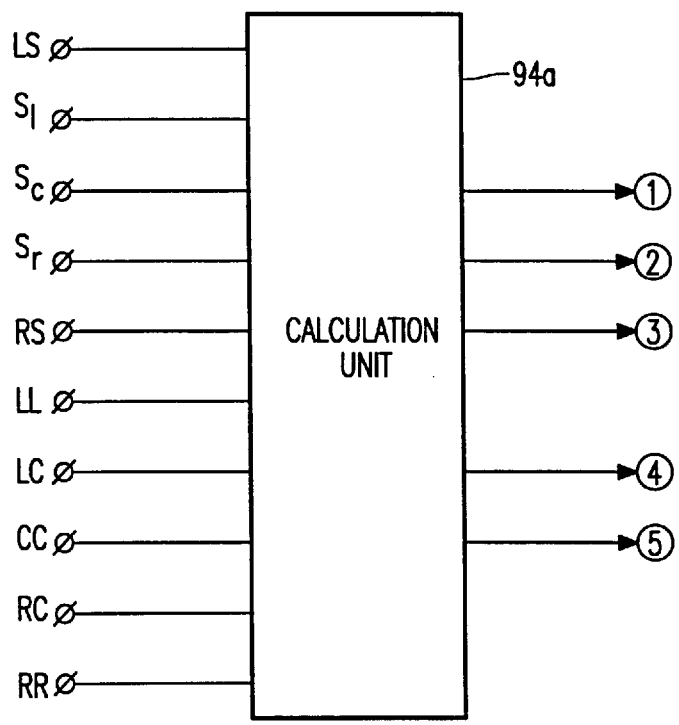
Figure 5:
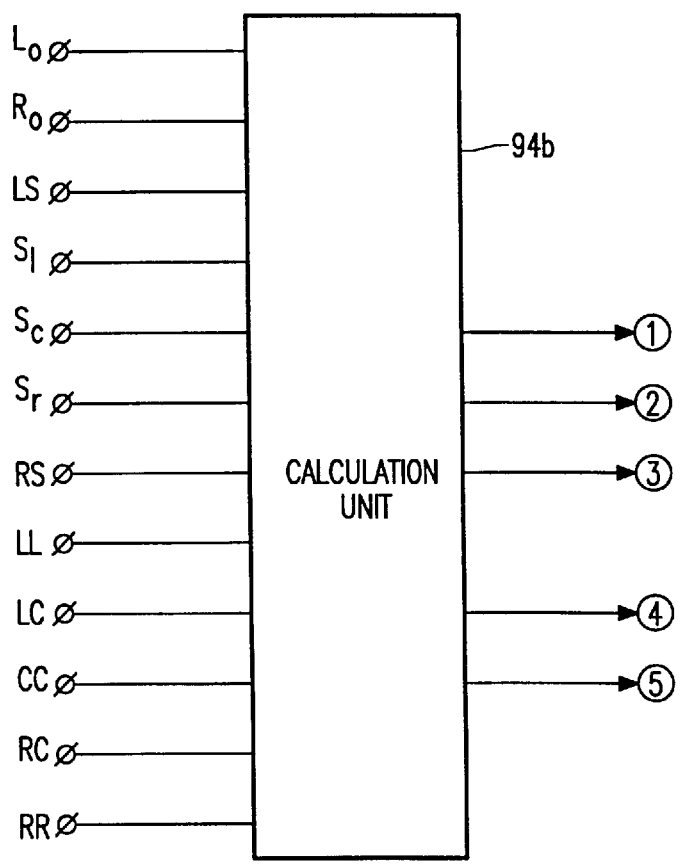
Figure 6:
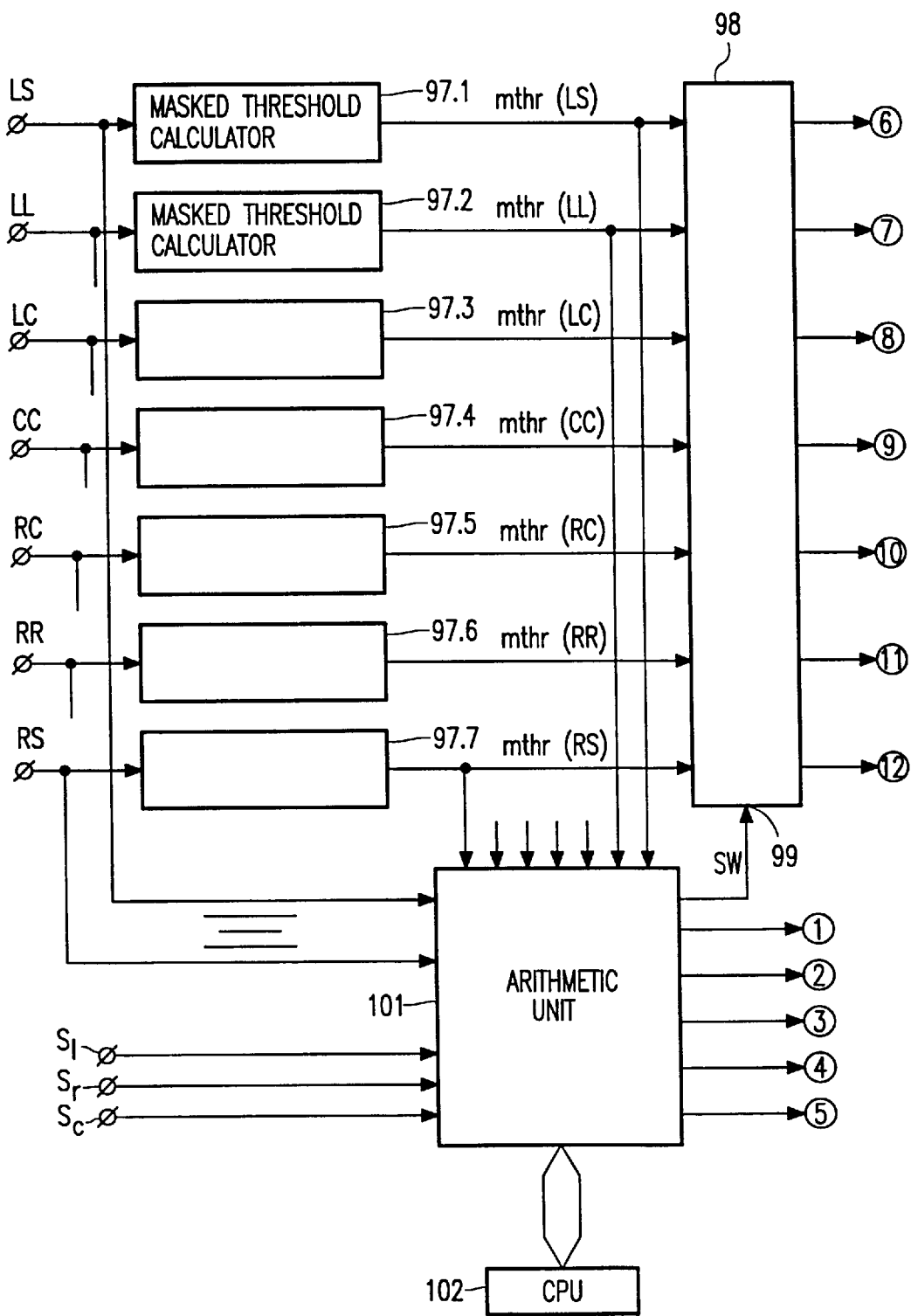
Figure 7:
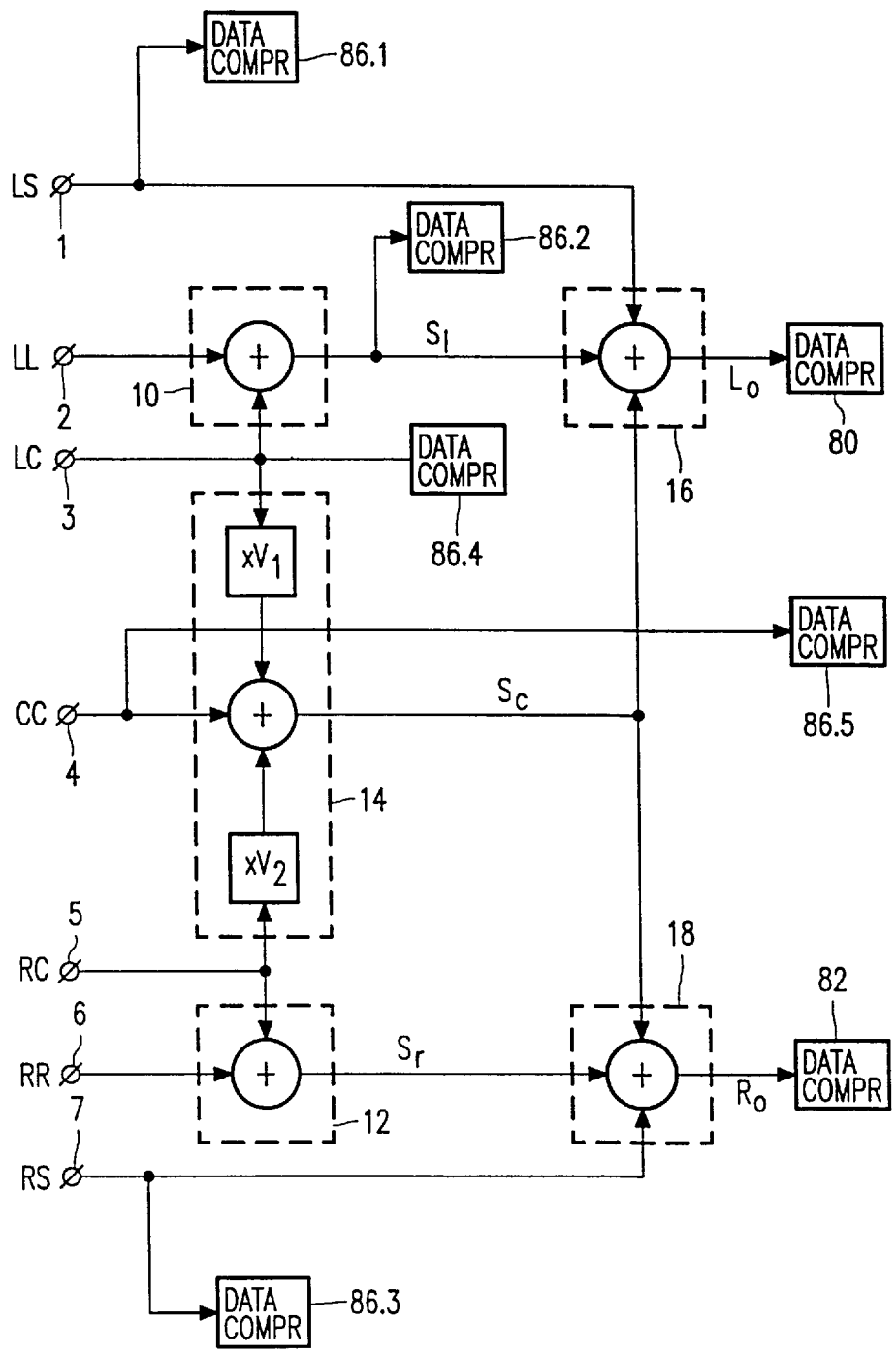
Figure 8:
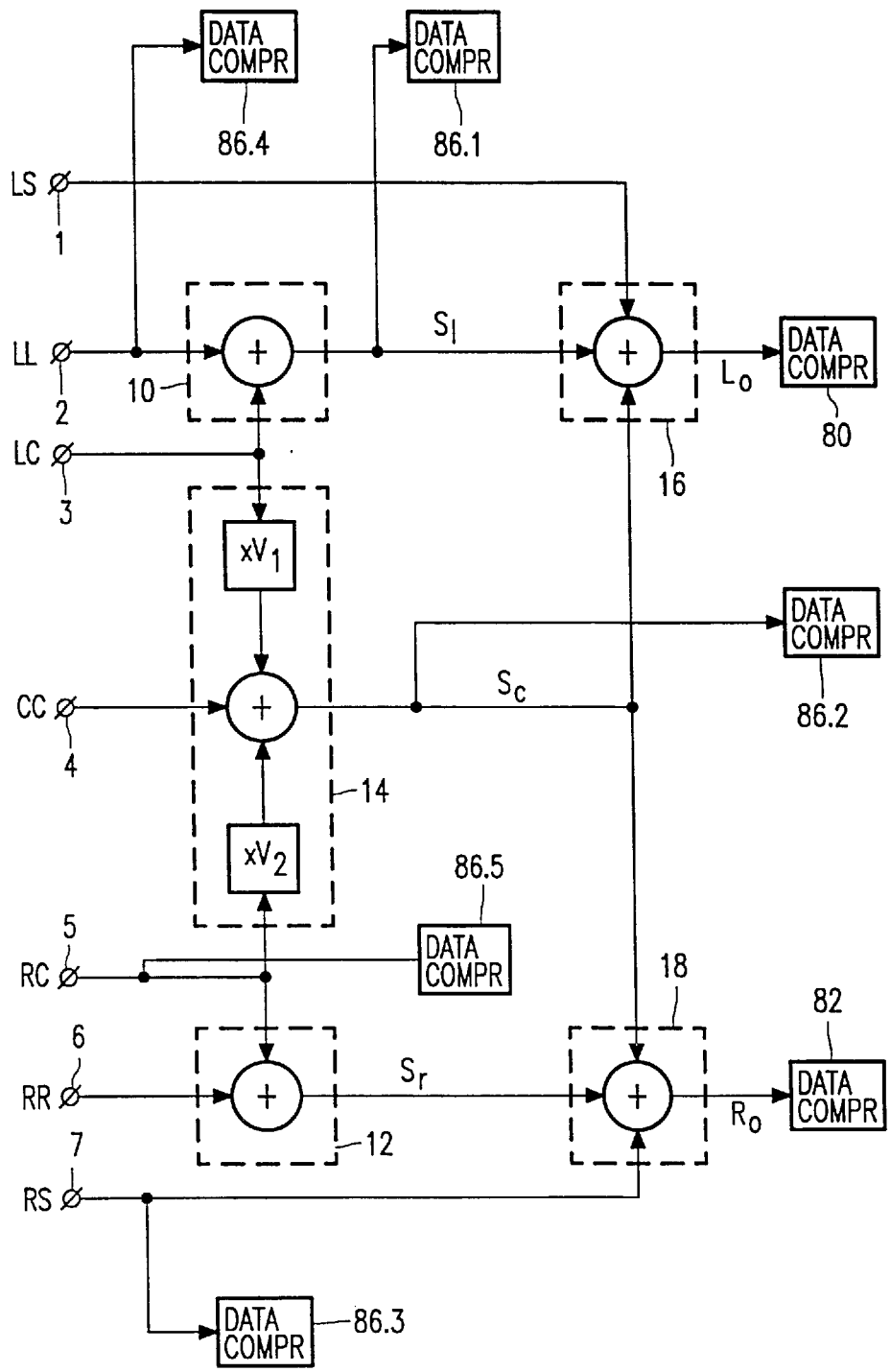
Figure 9:
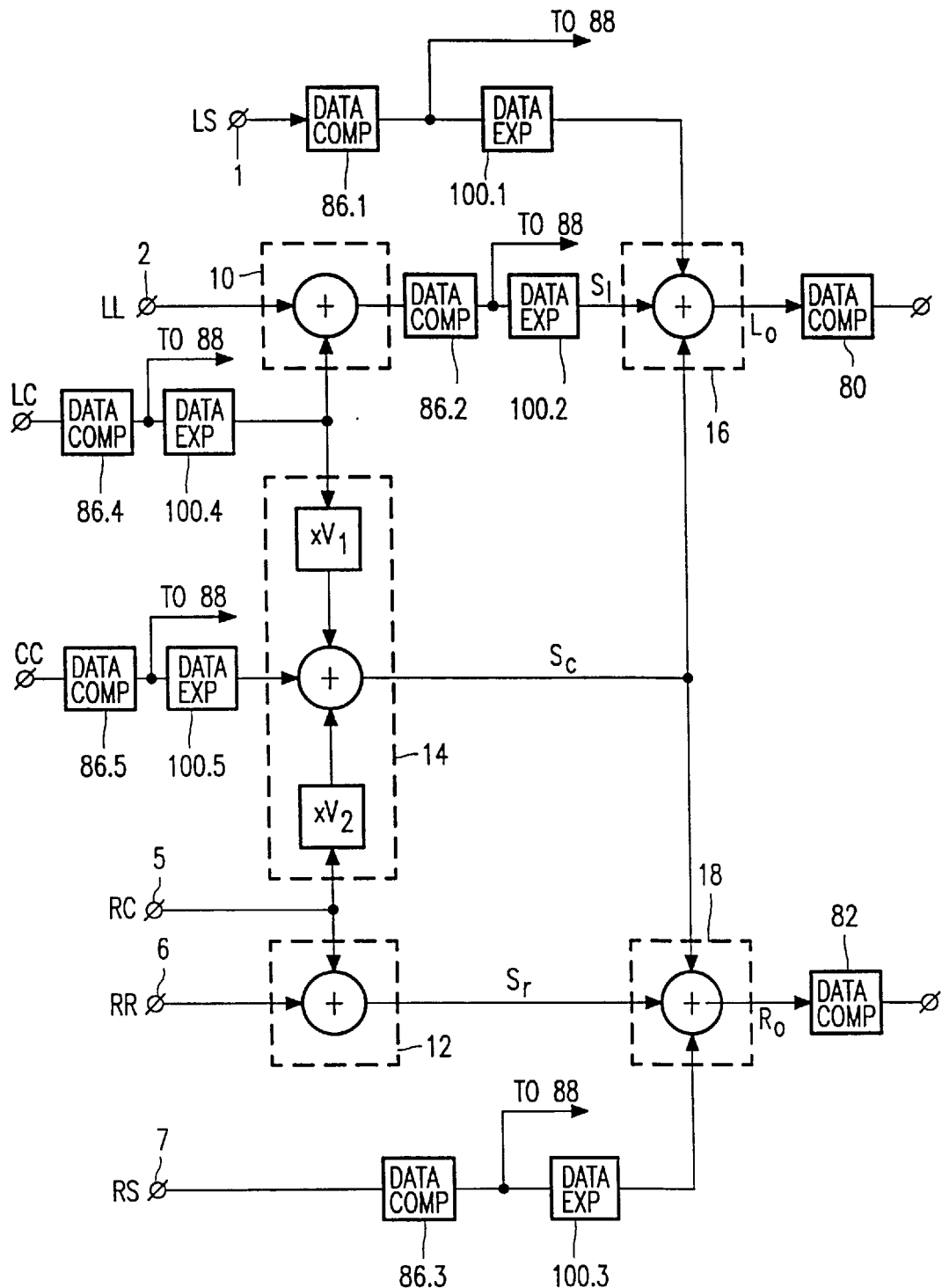
Figure 9A:
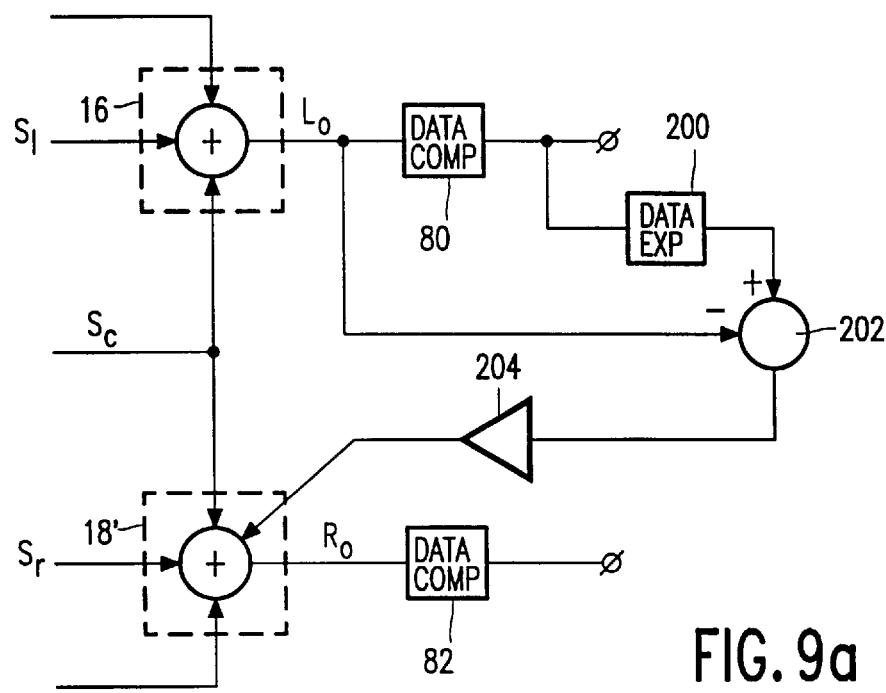
Figure 9B:
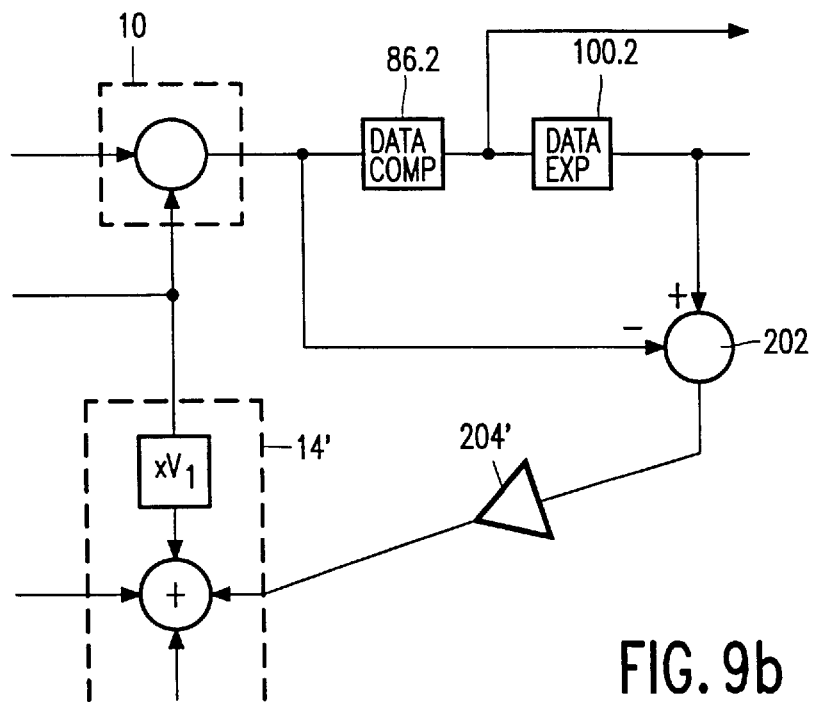
Figure 9C:
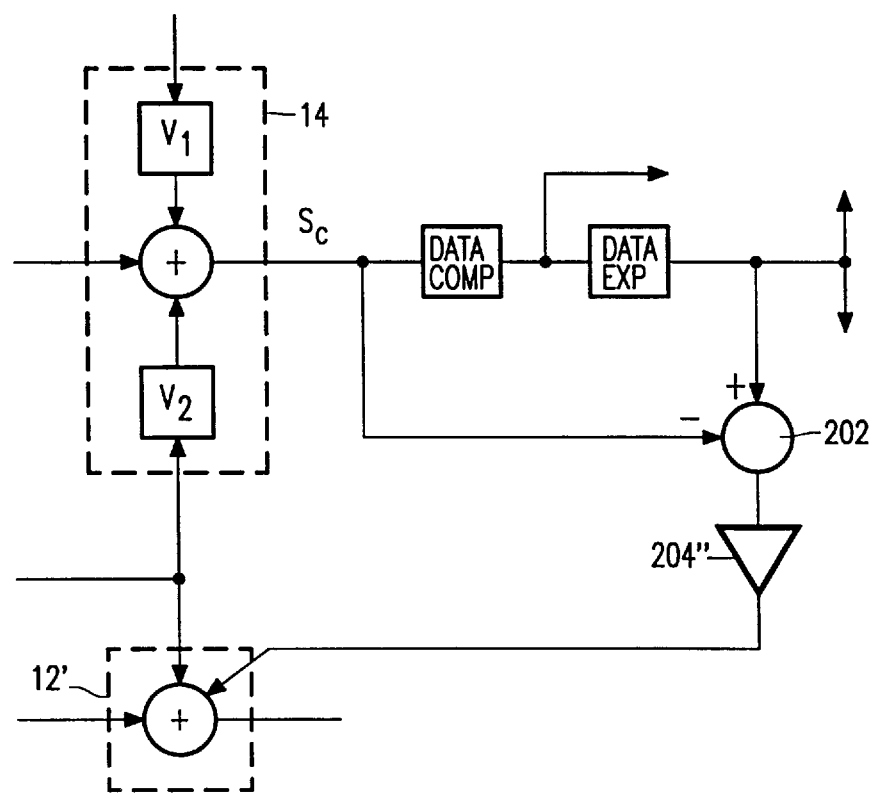
Figure 10:
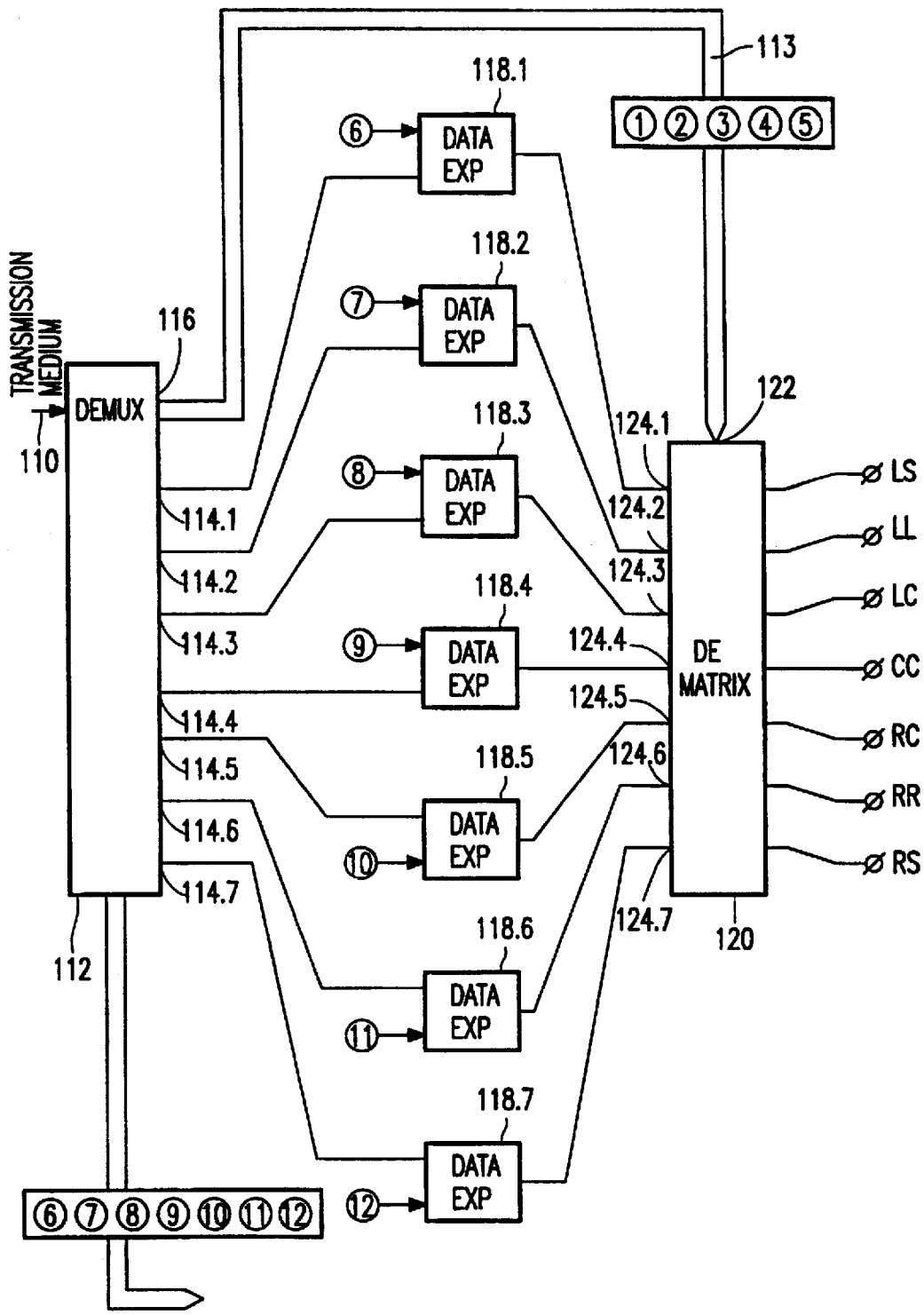
Figure 10A:
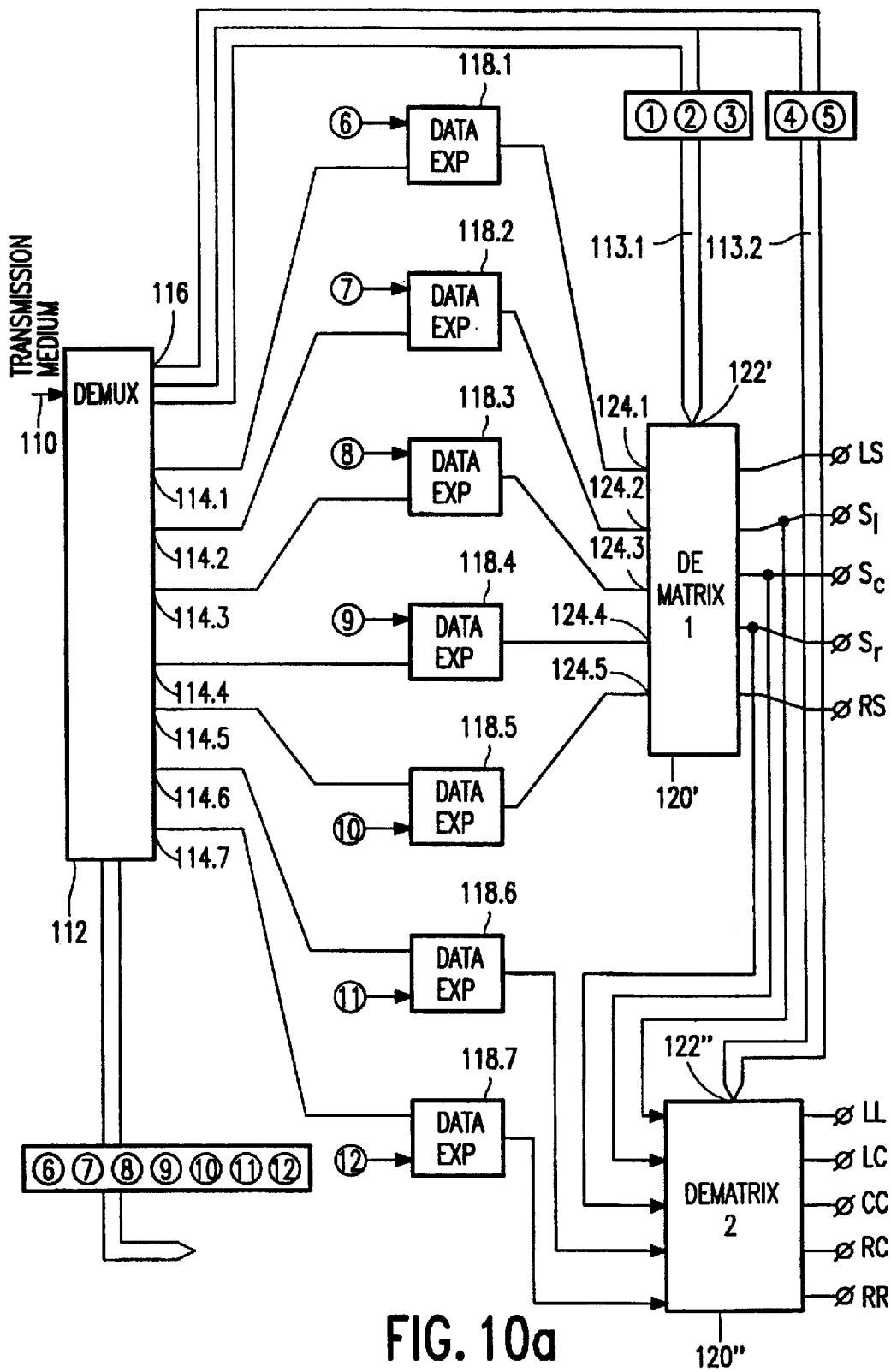
Figure 11:
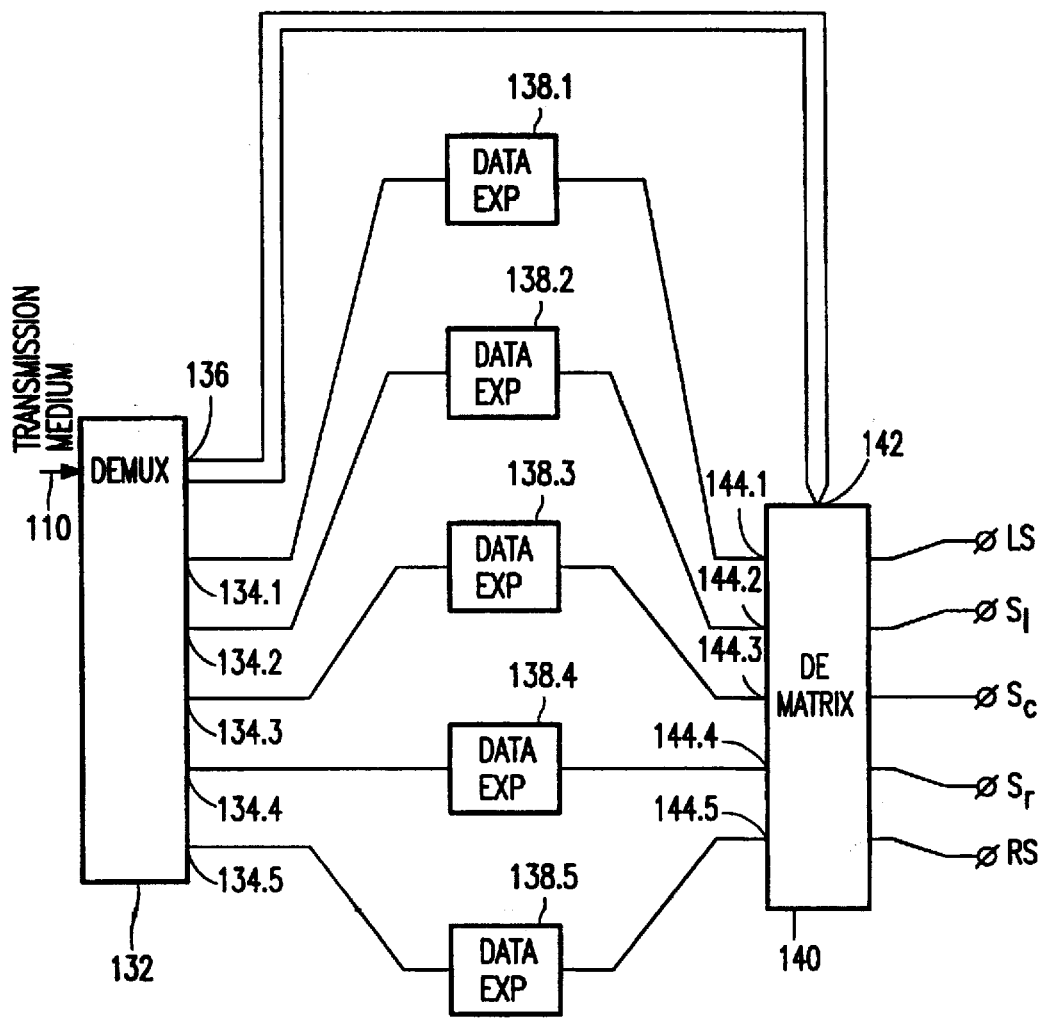
Figure 12:
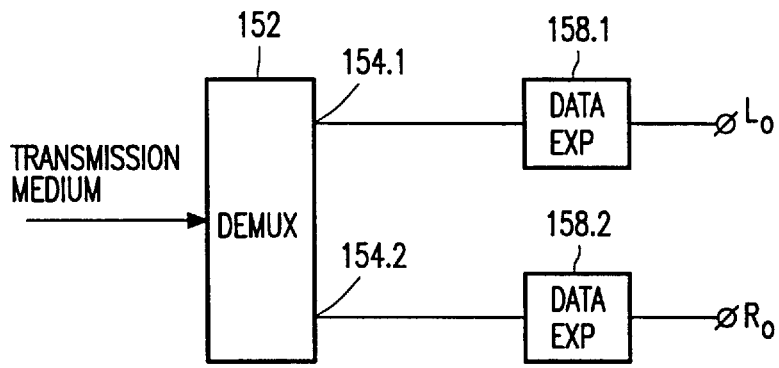
Figure 13:
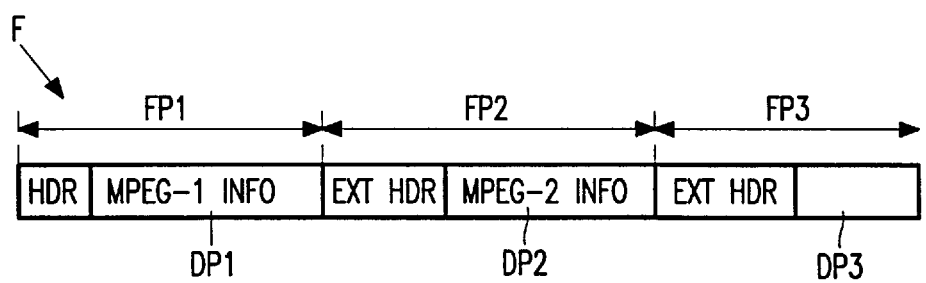
Figure 14:
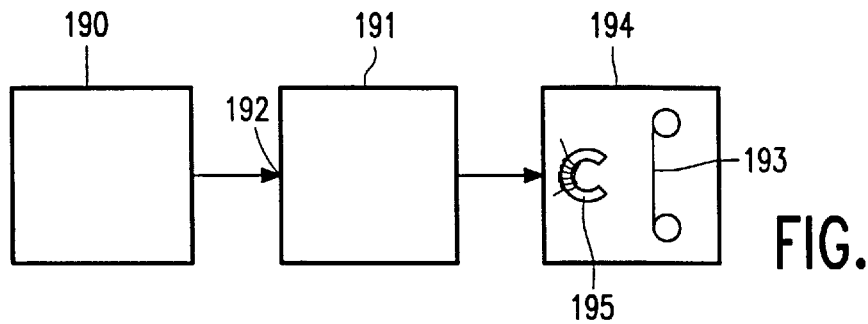
Figure 15:
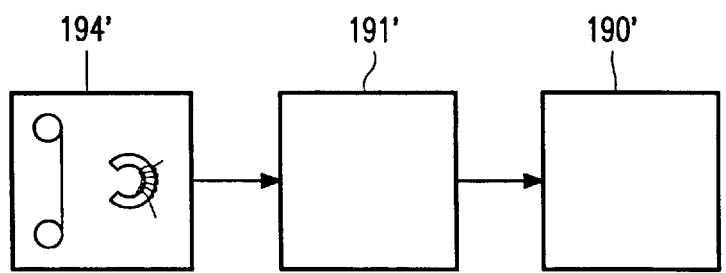

FIG. 2 shows the matrixing circuit in the encoder apparatus in accordance with the invention, FIG. 3 shows a further part of the encoder apparatus in accordance with the invention, FIGS. 4 and 5 show various embodiments of the calculation unit in the encoder, for deriving the selection signals, FIG. 6 shows a further elaborated version of the calculation unit, FIG. 7 shows one selection of seven signals for transmission, FIG. 8 shows another selection of seven signals for transmission, FIG. 9 shows the matrixing circuit provided with the additional pre-quantization and de-quantization measure carried out on the auxiliary signals, in the case of a selection of the auxiliary signals as shown in FIG. 7, FIGS. 9a, 9b and 9c show various further elaborations of parts of the matrixing circuit of FIG. 9, FIG. 10 shows the decoder apparatus in accordance with the invention, FIG. 10a shows another embodiment of the decoder apparatus in accordance with the invention, FIG. 11 shows the decoding of the transmission signal by a prior art MPEG-2 5-channel decoder, FIG. 12 shows the decoding of the transmission signal by a prior art MPEG-1 stereo decoder, FIG. 13 shows a frame included in the transmission signal, FIG. 14 shows the encoder apparatus included in a recording arrangement, and FIG. 15 shows the decoder apparatus included in a reproducing arrangement.

FIG. 1 shows a room in which seven loudspeakers are positioned, more specifically, five loudspeakers are positioned in front of the listener and two are positioned behind the listener. The five loudspeakers in front of the listener are denoted LL, for the extreme left position, RR, for the extreme right position, CC for the centre position, LC for the loudspeaker positioned in between the extreme left and centre loudspeaker and RC for the loudspeaker positioned in between the extreme right loudspeaker and the centre loudspeaker. The two loudspeakers behind the listener are denoted LS for the left surround loudspeaker, positioned at the left side of the listener and RS for the right surround loudspeaker, positioned at the right side of the listener. Signals for powering the seven loudspeaker can be obtained by positioning microphones at the same locations in the room and recording the seven signals thus obtained. Those signals will be denoted with the same references as the loudspeakers shown in FIG. 1. That is: the signal for the loudspeaker LS will also be denoted by LS, and so on.

It should be noted that the seven signals could have been obtained in any other way using multiple microphones, eg. more than 7, and using mixing.

Having obtained the seven signals LS, LL, LC, CC, RC, RR and RS, an encoder apparatus will be described for encoding the seven signals and converting them into a transmission signal for transmission via a transmission medium to a decoder with the possibility to decode the transmission signal into the seven signals. Encoding is realized by deriving an MPEG-1 compatible stereo signal $L_0, R_0$ from the seven signals in order to enable an MPEG-1 (2-channel stereo) decoder to decode the compatible stereo signal for normal stereo reproduction. Further, encoding is realized by deriving three auxiliary signals (a first, second and thrid auxiliary signal) in order to enable an MPEG-2 (5-channel) decoder to derive the compatible stereo signal and further to decode the compatible stereo signal and the three auxiliary signals into compatible centre and surround left and surround right signals for normal 5-channel (front left, right, centre and surround left and surround right) reproduction. Moreover, two additional auxiliary signals are derived in the encoder so as to enable a 7-channel decoder to decode those signals into the original 7 signals for reproduction in the way disclosed in FIG. 1.

Part of a first embodiment of the encoder is shown in FIG. 2 and another part of the encoder is shown in FIG. 3. FIG. 2 shows the part of the encoder for deriving the composite stereo signals $L_0$ and $R_0$. The encoder has input terminals 1 to 7 for receiving the seven information signals LS, LL, LC, CC, RC, RR and RS in digital form. The seven information signals may be wideband digital audio signals having a bandwidth of 20 kHz, e.g. sampled at 44.1 or 48 kHz, or multiples of those frequencies. The input terminals 2 and 3 are coupled to respective inputs 22 and 24 of a signal combination unit 10. An output 26 of the signal combination unit 10 is coupled to an input 28 of a signal combination unit 16. The input terminal 1 is coupled to an input 30 of the signal combination unit 16. The input terminal 3 is further coupled to an input 32 of a signal combination unit 14. The input terminal 4 is coupled to an input 34 of the signal combination unit 14. The input terminal 5 is coupled to inputs 36 and 38 of the signal combination unit 14 and a signal combination unit 12 respectively. The input terminal 6 is coupled to an input 40 of the signal combination unit 12, an output 42 of which is coupled to an input 44 of a signal combination unit 18. The input terminal 7 is coupled to an input 46 of the signal combination unit 18. An output of the signal combination unit 14 is coupled to inputs 50 and 52 of the signal combiantion units 16 and 18 respectively. The terminal 54 forms the output of the signal combination unit 16 and the terminal 56 forms the output of the signal combination unit 18. Generally said, the signal combination units combine the signals applied to their inputs, by multiplying the signals by respective multiplier values and adding the multiplied signals. Preferably, the signal combination units 10, 12, 16 and 18 are simply adders, whilst the signal combination unit 14 multiplies the signals LC and RC by $v_1$ and $v_2$ respectively, prior to adding them to the signal CC. The values $v_1$ and $v_2$ may be different from each other, but, generally, they will be equal to each other. As an example, the values $v_1$ and $v_2$ can both be chosen equal to zero. In such a situation, both multipliers in the signal combination unit 14 can be dispensed with and the inputs 32 and 36 and the connections of those inputs with the input terminals 3 and 5 can be left out. If both values are equal to unity, the multipliers can be replaced by an interconnection.

At the terminals 54 and 56, the compatible stereo signals $L_0$ and $R_0$ are available. The compatible signals satisfy the following equations:

$$L_0 = LL + (1+v_1) \cdot LC + CC + LS + v_2 \cdot RC \quad \text{(Eq.1)}$$

$$R_0 = RR + (1+v_2) \cdot RC + CC + RS + v_1 \cdot LC \quad \text{(Eq.2)}$$

The compatible signals $L_0$ and $R_0$ are supplied to data compression units 80 and 82, shown in FIG. 3. The data reduced compatible signals are converted in the block 88 in FIG. 3 into a transmission signal for transmission via a transmission medium (either a broadcast signal or a storage medium, such as a solid state memory, a magnetic or an optical record carrier). The combining unit 88 combines the signals applied to its input into a serial datastream and possibly also carries out a channel encoding on the information comprised in the serial datastream. Document (5) in the list of related documents describe one way of channel encoding the serial datastream so as to obtain the transmission signal. Preferably, the serial datastream is in accordance with the ISO/IEC standard given in document (9).

Upon reception by a receiver comprising a standard MPEG-1 decoder, this decoder is capable of decoding the compatible stereo signal ($L_0$, $R_0$) for stereo reproduction via two loudspeakers positioned in a room, such as the two loudspeakers LL and RR in FIG. 1.

At the outputs 26, 42 and 48 of the signal combination units 10, 12 and 14 respectively, signals $S_l$, $S_r$ and $S_c$ respectively are available that satisfy the following equations:

$$S_l = LL + LC \quad \text{(Eq.3)}$$

$$S_r = RR + RC \quad \text{(Eq.4)}$$

$$S_c = v_1 \cdot LC + v_2 \cdot RC + CC \quad \text{(Eq.5)}$$

The encoder is further provided with five selector units 84.1 to 84.5, see FIG. 3. The selector units 84.1 to 84.3 each select a different one of the five signals LS, $S_l$, $S_c$, $S_r$ and RS, supplied to the terminals 86.1 to 86.5 respectively. From FIG. 1, it is clear that the terminal 86.1 is in fact coupled to the input terminal 1 or with the input 30 of the signal combination unit 16, for receiving the signal LS and that the terminal 86.5 is in fact coupled to the terminal 7 or with the input 46 of the signal combination unit 18, for receiving the signal RS. Further, the terminal 86.2 of FIG. 3 is coupled to the input 28 of the signal combination unit 16 or the output 26 of the signal combination unit 10, for receiving the signal $S_l$. The terminal 86.3 of FIG. 3 is coupled to the input 50 or 52 of the signal combination units 16 or 18, or to the output 48 of the signal combination unit 14, for receiving the signal $S_c$, and the terminal 86.4 of FIG. 3 is coupled to the input 44 of the signal combination unit 18 or to the output 42 of the signal combination unit 12, for receiving the signal $S_r$. The signal selected by the selector 84.1 is called the first auxiliary signal, which is supplied to a data compression unit 86.1. The signal selected by the selector 84.2 is called the second auxiliary signal, which is supplied to a data compression unit 86.2. The signal selected by the selector 84.3 is called the third auxiliary signal, which is supplied to a data compression unit 86.3. The data compressed first, second and third auxiliary signals are also converted in the block 88 and combined with the data reduced compatible signals for transmission via the transmission medium. Preferably, the serial datastream is in accordance with the ISO/IEC standard given in document (10).

Upon reception by a receiver comprising a standard MPEG-2 (5-channel) decoder, this decoder is capable of decoding the compatible stereo signal ($L_0$,$R_0$) and the three auxiliary signals for a 5-channel surround reproduction via five loudspeakers in a room, such as the loudspeakers LL, CC, RR, LS and RS in FIG. 1.

As an example, suppose the selectors 84.1 to 84.3 have selected the signals LS, $S_l$ and RS as the first, second and third auxiliary signals. The decoder will receive the signals $L_0$, LS, $S_l$, RS and $R_0$. The eq. 1 and 2 given above can be replaced by $$L_0 = S_l + S_c + LS \quad \text{(Eq.6)}$$

$$R_0 = S_r + S_c + RS \quad \text{(Eq.7)}$$

Inserting LS and $S_l$ received by the decoder into eq. 6, and knowing $L_0$ (also received by the decoder), the decoder is capable of regenerating the signal $S_c$. Next, inserting $S_c$ and RS into eq. 7, and knowing $R_0$, results in the signal $S_r$. The signals $S_l$, $S_r$, $S_c$, LS and RS can now be reproduced in a 5-channel surround reproduction mode by supplying the signal $S_l$ to the loudspeaker LL, the signal $S_r$ to the loudspeaker RR, the signal $S_c$ to the loudspeaker CC, the signal LS to the loudspeaker LS and the signal RS to the loudspeaker RS in the room shown in FIG. 1.

As regards the selection carried out by the selection units 84.1 to 84.3, it is said that some selections of 3 of the signals from the five signals available (LS, $S_l$, $S_c$, $S_r$, RS) are not allowed, as they do not offer the possibility of recovering all five signals in the decoder. More specifically, it is not allowed to select the signals $S_c$, $S_r$ and RS as the first, second and third auxiliary signals, as in this situation, the decoder is not able to regenerate the signals $S_l$ and LS. In the same way, it is not allowed to select the signals $S_c$, $S_l$ and LS as the first, second and third auxiliary signals, as in this situation, the decoder is not capable of regenerating the signals $S_r$ and RS.

The selector units 84.4 and 84.5 each select a different one of the five signals LL, LC, CC, RC and RR, supplied to the terminals 86.6 to 86.10 respectively. From the FIGS. 2 and 3, it is clear that the terminal 86.6 is in fact coupled to the input terminal 2 or with the input 22 of the signal combination unit 10, for receiving the signal LL and that the terminal 86.7 is in fact coupled to the terminal 3 or with one of the inputs 24 or 32 of the signal combination units 10 or 14, for receiving the signal LC. Further, the terminal 86.8 of FIG. 3 is coupled to the input terminal 4 or with the input 34 of the signal combination unit 14, for receiving the signal CC. The terminal 86.9 of FIG. 3 is coupled to the input terminal 5 or with one of the inputs 36 or 38 of the signal combination units 14 or 12 respectively, for receiving the signal RC, and the terminal 86.10 of FIG. 3 is coupled to the input terminal 6 or with the input 40 of the signal combination unit 12, for receiving the signal RR. The signal selected by the selector 84.4 is called the fourth auxiliary signal, which is supplied to a data compression unit 86.4. The signal selected by the selector 84.5 is called the fifth auxiliary signal, which is supplied to a data compression unit 86.5. The data compressed fourth and fifth auxiliary signals are also converted in the block 88 and combined with the data reduced compatible signals and the data reduced first, second and third auxiliary signals for transmission via the transmission medium. Upon reception by a receiver comprising an improved 7-channel decoder (to be described later), this decoder is capable of decoding the compatible stereo signal ($L_0$,$R_0$) and the five auxiliary signals for a 7-channel surround reproduction via seven loudspeakers in a room, such as the loudspeakers LL, LC, CC, RC, RR, LS and RS in FIG. 1.

As an example, suppose the selectors 84.1 to 84.3 have (again) selected the signals LS, $S_l$ and RS as the first, second and third auxiliary signals and the selectors 84.4 and 84.5 have selected the signals LC and CC as the fourth and fifth auxiliary signals. The decoder will receive the signals $L_0$, LS, $S_l$, RS, $R_0$, LC and CC.

Using eq. 1 given above and inserting therein the signals $L_0$, LC, CC and LS, all received by the decoder, the decoder is capable of regenerating the signal LL, assuming $v_1$ is known. Further, using eq. 6 given above, one can obtain $S_c$, which itself satisfies the equation 5 given above.

Knowing $S_c$, and inserting CC and LC into equation 5, results in RC, assuming $v_2$ is known. Now inserting RC, CC and. RS into equation 2 above, results in RR. The signals LS, LL, LC, CC, RC, RR and RS can now be reproduced in a 7-channel surround reproduction mode by supplying the signal LL to the loudspeaker LL, the signal RR to the loudspeaker RR, the signal CC to the loudspeaker CC, the signal LC to the loudspeaker LC, the signal RC to the loudspeaker RC, the signal LS to the loudspeaker LS and the signal RS to the loudspeaker RS in the room shown in FIG. 1.

As regards the selection carried out by the selection units 84.4 and 84.5, it is said that some selections of 2 of the signals from the five signals available (LL, LC, CC, RC, RR) are not allowed, as they do not offer the possibility of recovering all seven signals in the decoder. More specifically, it is not allowed to select the signals RR and RC as the fourth and fifth auxiliary signals, as in this situation, the decoder is not able to regenerate the signals LL, LC and CC. In the same way, it is not allowed to select the signals LC and LL as the fourth and fifth auxiliary signals, as in this situation, the decoder is not capable of regenerating the signals RC, RR and CC.

Further, if $v_1=0$, one of the signals LL and LC must be selected and one of the signals CC, RC and RR in order to obtain the fourth and fifth auxiliary signals, and, if $v_2=0$, one of the signals RC and RR must be selected and one of the signals CC, LC and LL in order to obtain the fourth and fifth auxiliary signals. If both $v_1$ and $v_2$ are zero, one of the signals LL and LC and one of the signals RR and RC must be selected.

The selection of the auxiliary signals can be realized as follows. The encoder apparatus is provided with a calculation unit 94, shown in FIG. 4, which receives as input signals the signals LS, $S_l$, $S_c$, $S_r$, RS, LL, LC, CC, RC and RR. The calculation unit 94 generates five selection signals denoted by encircled numbers 1, 2, 3, 4 and 5. The selection signal with encircled number 1 is supplied to a selection input 90.1 of the selector unit 84.1, see FIG. 3. The selection signal with encircled number 2 is supplied to a selection input 90.2 of the selector unit 84.2. The selection signal with encircled number 3 is supplied to a selection input 90.3 of the selector unit 84.3. The selection signal with encircled number 4 is supplied to a selection input 90.4 of the selector unit 84.4. The selection signal with encircled number 5 is supplied to a selection input 90.5 of the selector unit 84.5.

It will be clear that, in order to enable the decoder to decode the seven original signals from the signals transmitted via and received from the transmission medium, it will be required to transmit the selection signals together with the transmitted signals. Therefore, in the embodiment of FIG. 3, the selection signals are supplied via the line 96 to the signal combining unit 88. The selection signals are included in the transmission signal for transmission, so that they can be retrieved by the decoder upon reception.

Various algorithms are possible to generate the five selection signals from the input signals supplied to the calculation unit 94. In one embodiment of the calculation unit 94, shown in FIG. 4, the calculation unit is given the reference numeral 94a and is adapted to calculate the amount of data reduction to be achieved with the data compressor units 84.1 to 84.5 dependent of which of the three signals from the first group of five signals (Ls, $S_l$, $S_c$, $S_r$, RS) have been chosen as the first to third auxiliary signals and which of the two signals from the second group of five signals (LL, LC, CC, RC, RR) have been chosen as the fourth and fifth auxiliary signals. The calculation unit 94a is further adapted to establish those selections of three signals from the first group of five signals and two signals from the second group of five signals that result in the largest amount of data reduction to be achieved and generates the five selection signals in response thereto.

In another embodiment of the calculation unit 94, shown in FIG. 5, the calculation unit 94 is given the reference numeral 94b and has two further inputs for receiving the signals $L_0$ and $R_0$. The calculation unit 94b is adapted to calculate the amount of data reduction to be achieved with the data compressor units 80, 82 and 86.1 to 86.5 of FIG. 3 dependent of which of the three signals from the first group of five signals (LS, $S_l$, $S_c$, $S_r$, RS) have been chosen as the first to third auxiliary signals and which of the two signals from the second group of five signals (LL, LC, CC, RC, RR) have been chosen as the fourth and fifth auxiliary signals. The calculation unit 94b is further adapted to establish those selections of three signals from the first group of five signals and two signals from the second group of five signals that result in the largest amount of data reduction to be achieved and to generate the five selection signals in response thereto.

In again another embodiment of the calculation unit 94, not shown in a figure, the calculation unit 94 is adapted to calculate the amount of data reduction to be achieved with the data compressor units 80 and 82 of FIG. 3 dependent of which of the three signals from the first group of five signals (LS, $S_l$, $S_c$, $S_r$, RS) have been chosen as the first to third auxiliary signals and which of the two signals from the second group of five signals (LL, LC, CC, RC, RR) have been chosen as the fourth and fifth auxiliary signals. This embodiment of the calculation unit 94 is further adapted to establish those selections of three signals from the first group of five signals and two signals from the second group of five signals that result in the largest amount of data reduction to be achieved and to generate the five selection signals in response thereto.

It seems not evident that different selections of three of the five signals of the first group (LS, $S_l$, $S_c$, $S_r$, RS) and of two of the five signals of the second group (LL, LC, CC, RC, RR) will lead to different data reduction ratios in the data compressor units 80 and 82. It should be noted that they do. This will be explained with reference to the FIGS. 7 and 8. FIG. 7 shows a situation where the signals LS, $S_l$ and RS have been selected as the first, second and third auxiliary signals and are supplied to the data compressor units 86.1, 86.2 and 86.3 respectively, via the selector units 84.1, 84,2 and 84.3 respectively of FIG. 3, but not shown in FIG. 7. Further, the signals LC and CC have been selected as the fourth and fifth auxiliary signals. Those signals are thus supplied to the data compressor units 86.4 and 86.5 respectively, via the selector units 84.4 and 84.5 respectively of FIG. 3, bit not shown in FIG. 7. Further, FIG. 7 shows the data compression units 80 and 82 for data compressing the signals $L_0$ and $R_0$ respectively.

Prior art publications describe the way in which a data reduction can be carried out on a signal applied to a data compressor unit 80, 82, 86.i, where i runs from 1 to 5. Reference is made in this respect to the various documents cited in the list of documents, at the end of this description. One of such data reduction techniques is the subband coding data reduction technique, as applied in MPEG-1 and MPEG-2 and DAB (digital audio broadcast). Documents describing the subband coding data reduction technique are the documents (3), (4), (6), (7a), (7b), (9) and (10). In this data reduction technique, signal components below a masked threshold are left out. The masked threshold is obtained from the signal to be data reduced.

The documents (1a), (1b), (2) and (8) describe multi-channel transmission systems in which a compatible stereo signal, the signals $L_0$ and $R_0$ described above, are data reduced. In such situations, the masked threshold is generally not obtained from the compatible signals itself, but from any original signal from which the compatible signals have been derived. More specifically, the masked threshold for data reducing the $L_0$ component is obtained from a signal that is not transmitted as an auxiliary signal. In the same way, the masked threshold for data reducing the $R_0$ component is obtained from a signal that is not transmitted as an auxiliary signal.

Applying these teachings to the situation described in FIG. 7, the masked threshold for the data compression unit 80 cannot come from the signals LS and $S_l$, as they are both transmitted as auxiliary signals. The masked threshold should thus come via the signal $S_c$, as $S_c$ is not transmitted as auxiliary signal. As both the signals LC and CC are transmitted as auxiliary signals, this means that the masked threshold for the data compressor unit 80 must be derived from the signal RC. The masked threshold for the data compression unit 82 cannot come from the signal RS, as it is transmitted as auxiliary signal. The masked threshold should thus come via the signal $S_r$ as the signal $S_c$ has already been used for deriving the masked threshold for $L_0$. As the signal RC has been used for obtaining the masked threshold for $L_0$ this means that the masked threshold for the data compressor unit 82 must be derived from the signal RR.

To complete the discussion of the masked thresholds for the other data compression units, the following can be said. The masked threshold for the data compression unit 86.1 is derived from LS, as usual. The masked threshold for the data compression unit 86.3 is derived from RS, as usual. The masked threshold for the data compression unit 86.4 is derived from LC, as usual. The masked threshold for the data compression unit 86.5 is derived from CC, as usual. The masked threshold for the data compression unit 86.2 requires a further discussion, as the masked threshold for this compression unit may be derived from LL or LC. As the signal LC has already been used for deriving the masked threshold for the data compression unit 86.4, this means that the signal LL is used for deriving the masked threshold for the data compression unit 86.2.

FIG. 8 shows another selection of the five auxiliary signals. FIG. 8 shows a situation where the signals $S_l$, $S_c$ and RS have been selected as the first, second and third auxiliary signals and are supplied to the data compressor units 86.1, 86.2 and 86.3 respectively, via the selector units 84.1, 84.2 and 84.3 respectively of FIG. 3, but not shown in FIG. 8. Further, the signals LL and RC have been selected as the fourth and fifth auxiliary signals. Those signals are thus supplied to the data compressor units 86.4 and 86.5 respectively, via the selector units 84.4 and 84.5 respectively of FIG. 3, but not shown in FIG. 8. Further, FIG. 8 again shows the data compression units 80 and 82 for data compressing the signals $L_0$ and $R_0$ respectively.

The masked threshold for the data compression unit 80 cannot come from the signals $S_l$ and $S_c$, as they are both transmitted as auxiliary signals. The masked threshold should thus come from the signal LS, as LS is not transmitted as auxiliary signal. The masked threshold for the data compression unit 82 cannot come from the signals RS and $S_c$, as both are transmitted as auxiliary signals. The masked threshold should thus come via the signal $S_r$. As the signal RC is transmitted as auxiliary signal, this means that the masked threshold for the data compressor unit 82 must be derived from the signal RR.

To complete the discussion of the masked thresholds for the other data compression units, the following can be said. The masked threshold for the data compression unit 86.1 is derived from LC, as LL is transmitted as auxiliary signal. The masked threshold for the data compression unit 86.3 is derived from RS, as usual. The masked threshold for the data compression unit 86.4 is derived from LL, as usual. The masked threshold for the data compression unit 86.5 is derived from RC, as usual. The masked threshold for the data compression unit 86.2 requires a further discussion, as the masked threshold for this compression unit may be derived from CC, RC or LC. As the signals RC and LC have already been used for deriving the masked thresholds for the data compression units 86.5 and 86.1 respectively, this means that the signal CC is used for deriving the masked threshold for the data compression unit 86.2.

The conclusion should thus be that, in the situation shown in FIG. 7, the masked thresholds for the data compression units 80 and 82 are obtained from the signals RC and RR respectively and that, in the situation shown in FIG. 8, the masked thresholds for the data compression units 80 and 82 are obtained from the signals LS and RR respectively. Different masked threshold will thus generally lead to different data reduction ratios in the data compression units 80 and 82, as a result of different selections for the five auxiliary signals.

In order to provide the data compression units 80, 82 and 86.1 to 86.5 with the correct masked thresholds in order to carry out a data compression step, the calculation unit 94 will be further discussed with reference to FIG. 6. The calculation unit 94 must at least receive the seven original signals LS, LL, LC, CC, RC, RR and RS as, as has been explained above, in the end the seven masked thresholds required for the seven data compression units 80, 82 and 84.1 to 84.5 are the seven masked thresholds obtained from the seven original signals. Those seven signals are supplied to seven masked threshold calculators 97.1 to 97.7. The masked threshold calculators 97.1 to 97.7 calculate seven masked thresholds mthr(LS), mthr(LL), mthr(LC), mthr(CC), mthr(RC), mthr(RR) and mthr(RS), respectively. The seven masked thresholds are supplied to a switching unit 98, which connects one of the seven inputs to one of its seven outputs, in response to a switching signal sw supplied to a control signal input 99. One of the outputs of the switching unit 98, denoted with the encircled number 6, supplies one of the seven masked thresholds to the data compression unit 80, see also FIG. 3. The second output of the switching unit 98, denoted with the encircled number 7, supplies another one of the seven masked thresholds to the data compression unit 82. The third output of the switching unit 98, denoted with the encircled number 8, supplies again another one of the seven masked thresholds to the data compression unit 86.1. The fourth output of the switching unit 98, denoted with the encircled number 9, supplies again another one of the seven masked thresholds to the data compression unit 86.2. The fifth output of the switching unit 98, denoted with the encircled number 10, supplies again another one of the seven masked thresholds to the data compression unit 86.3. The sixth output of the switching unit 98, denoted with the encircled number 11, supplies again another one of the seven masked thresholds to the data compression unit 86.4. The seventh output of the switching unit 98, denoted with the encircled number 12, supplies again another one of the seven masked thresholds to the data compression unit 86.5.

The switching signal sw is supplied by an arithmetic unit 101. This arithmetic unit 101 further receives the seven masked thresholds generated by the masked threshold calculators 97.1 to 97.7, as well as the original seven signals LS, LL, LC, CC, RC, RR and RS and at least the signals $S_l$, $S_c$ and $S_r$, namely in the embodiment of the calculation unit 94a, described above with reference to FIG. 4. In case of the second embodiment of the calculation unit 94b, described with reference to FIG. 5, as well as the third embodiment, also the signals $L_O$ and $R_O$ need to be supplied to the arithmetic unit 101. The arithmetic unit 101 is controlled by means of a central processing unit 102.

In the (first) embodiment of the calculation unit 94a, the arithmetic unit 101 is adapted to calculate the amount of data reduction to be achieved with the data compressor units 84.1 to 84.5 dependent of which of the three signals from the first group of five signals (LS, $S_l$, $S_c$, $S_r$, RS) have been chosen as the first to third auxiliary signals and which of the two signals from the second group of five signals (LL, LC, CC, RC, RR) have been chosen as the fourth and fifth auxiliary signals. The arithmetic unit 101 is further adapted to establish those selections of three signals from the first group of five signals and two signals from the second group of five signals that result in the largest amount of data reduction to be achieved and generates the five selection signals in response thereto. Those selection signals are supplied as the output signals of the calculation unit 94a. Further, a switching signal sw is generated by the arithmetic unit 101 in response to the five selection signals generated, so that the correct masked thresholds are supplied to the seven data compression units 80, 82 and 86.1 to 86.5.

In the (second) embodiment of the calculation unit 94b, also the signals $L_O$ and $R_O$ need to be supplied to the arithmetic unit 101, and the arithmetic unit 101 is adapted to calculate the amount of data reduction to be achieved with the data compressor units 80, 82 and 86.1 to 86.5 of FIG. 3 dependent of which of the three signals from the first group of five signals (LS, $S_l$, $S_c$, $S_r$, RS) have been chosen as the first to third auxiliary signals and which of the two signals from the second group of five signals (LL, LC, CC, RC, RR) have been chosen as the fourth and fifth auxiliary signals. The arithmetic unit 101 is further adapted to establish those selections of three signals from the first group of five signals and two signals from the second group of five signals that result in the largest amount of data reduction to be achieved and to generate the five selection signals in response thereto. Those selection signals are supplied as the output signals of the calculation unit 94b. Further, a switching signal sw is generated by the arithmetic unit 101 in response to the five selection signals generated, so that the correct masked thresholds are supplied to the seven data compression units 80, 82 and 86.1 to 86.5.

From the foregoing description, it is clear that the original seven information signals LS, LL, LC, CC, RC, RR and RS are applied to the matrixing circuit described with reference to FIG. 2. See also the FIGS. 7 and 8 in this respect.

The masked threshold control signals, denoted encircled numbers 6 to 12 are supplied to the combining unit 88 as well for transmission to the decoder, as is shown in FIG. 3.

A further measure that can be applied to the encoder apparatus, is the measure to data compress and subsequently expand the selected auxiliary signals prior to applying them to the matrixing circuit of FIG. 2. This measure is shown in FIG. 9, going out from the situation given in FIG. 7, where the signals LS, $S_l$, RS, LC and CC had been selected as auxiliary signals. As can be seen, in the FIG. 9, each data compression unit 86.i is followed by a data expansion unit 100.i (where i runs from 1 to 5). At the output of the expansion unit, a replica of the original signal applied to the preceding compression unit is obtained, which is further used in the matrixing circuit for obtaining the compatible signals $L_O$ and $R_O$. An extensive discussion of this measure of pre-quantization and subsequent expansion is given in the documents (2) and (8). The outputs of the compression units 86.1 to 86.5 are supplied to the combining unit 88 of FIG. 3, as is indicated in FIG. 9.

Document (8) of the list of related documents, given below, more specifically the FIGS. 11 and 12 in that document, discloses a further improvement. FIG. 11 in that document describes the measure to data expand a data compressed signal directly after compression. The data expanded signal and the original signal ($L_O$), prior to compression, are subtracted from each other and the difference signal thus obtained is supplied to the other signal ($R_O$). This has been made visible in FIG. 9a. An additional data expander unit 200 expands the data compressed signal $L_O$ in order to obtain a replica of the signal $L_O$, which is supplied to an input of a signal combination unit 202, which functions as a subtractor unit. The original signal $L_O$ is supplied to another input of the unit 202. The difference signal thus obtained is supplied to the signal combination unit 18' via an amplifier unit 204. The amplification factor of the amplifier unit 204 is preferably equal to $(1+v_2)/v_2$. More preferably, the difference signal is supplied to the signal combination unit 18' after amplification by a factor of unity and supplied to the signal combination unit 12 after amplification by a factor of $1/v_2$.

Instead of applying the teachings of FIG. 11 of the document (8), one could have applied the teachings of FIG. 12 of document (8). This results in coupling the input of the additional data expansion unit 200 to the output of the data compression unit 82, coupling the second input of the subtractor unit 202 to the output of the signal combination unit 18 and coupling the output of the subtractor unit 202 to the signal combination unit 16, and preferably also coupling the output of the subtractor unit 202 to the signal combination unit 10. The amplification factor of the amplifier unit 204 is now preferably equal to $(1+v_1)/v_1$. In the more preferable situation that the difference signal is supplied to the signal combination unit 16 as well as to the combination unit 10, the difference signal is supplied to the combination unit 16 after amplification by a factor of unity and supplied to the signal combination unit 10 after amplification by a factor of $1/v_1$.

The teachings of the FIGS. 11 and 12 of document (8) can also be applied at other locations in the circuit of FIG. 9. This is shown in FIG. 9b. The additional data expander unit 200 expands the data compressed signal $S_l$ in order to obtain a replica of the signal $S_l$, which is supplied to the subtractor unit 202. The original signal $S_l$ is supplied to the other input of the unit 202. The difference signal thus obtained is supplied to the signal combination unit 14' via the amplifier unit 204', which now preferably has an amplification factor of $v_1$.

Instead of applying the teachings of FIG. 11 of the document (8), one could have applied the teachings of FIG. 12 of document (8) to the signal $S_r$. This results in a series arrangement of a data compression unit and a data expansion unit in the interconnection between the combination units 12 and 18. The output of the subtractor unit 202 is now coupled to the signal combination unit 14, via an amplifier unit having an amplification factor of $v_2$.

Applying the teachings of the FIGS. 11 and 12 of document (8) to the signal $S_c$, results in the circuit construction shown in FIG. 9c. A series arrangement of a data compression unit and a data expansion unit are provided in the interconnection between the combination unit 14 and the combination units 16 and 18. The output of the subtractor unit 202 is now coupled to either the signal combination unit 10 or the signal combination unit 12'. FIG. 9c shows a coupling to the combination unit 12'. The amplification factor of the amplifier unit 204" equals $1/v_2$. If the amplifier unit 204" is coupled to the combination unit 10, the amplification factor will be $1/v_1$.

FIG. 10 shows an embodiment of a 7-channel decoder apparatus for decoding the transmission signal into replicas of the original signals. The decoder apparatus has an input for receiving the transmission signal. The transmission signal is supplied to a demultiplexer unit 112, after having carried out a channel decoding step, which is the inverse of the channel encoding step carried out in the encoder. The demultiplexer unit 112 is capable of retrieving the seven signal components, that is: the data compressed compatible signals $L_0$ and $R_0$, and the data compressed first to fifth auxiliary signals from the serial datastream and supplies the data reduced compatible signal $L_0$ to an output 114.1, the data reduced compatible signal $R_0$ to an output 114.2 and the first to fifth data reduced auxiliary signals to outputs 114.3 to 114.7 respectively. Further, the demultiplexer unit 112 retrieves the selection signals from the serial datastream and supplies the selection signals to an output 116. The outputs 114.1 to 114.7 are coupled to inputs of respective data expansion units 118.1 to 118.7. At the outputs of the expansion units 118.1 to 118.7, replicas of the original signals applied to the data compression units 80, 82, 86.1 to 86.5 become available, in response to the masking control signals denoted encircled numbers 6 to 12, also retrieved by the demultiplexer unit 112 from the transmission signal. The replicas are supplied to respective inputs of a dematrixing unit 120. The selection signals retrieved by the demultiplexer 112 are supplied to a control input 122 of the dematrixing unit 120, so as to dematrix the signals applied to its inputs 124.1 to 124.7 into the replicas of the original signals LS, LL, LC, CC, RC, RR and RS.

FIG. 10a shows another embodiment of the decoder apparatus in accordance with the invention. The decoder apparatus shows large resemblace with the decoder apparatus of FIG. 10. Instead of having one dematrixing unit 120, as in FIG. 10, the apparatus of FIG. 10a has two dematrixing units 120' and 120". The demultiplexer unit 112 retrieves the selection signals from the serial datastream and supplies part of the selection signals, namely the selection signal denoted by encircled numbers 1, 2 and 3 to the control input 122' of the dematrixing unit 120' and supplies the remaining part of the selection signals, namely the selection signal denoted by encircled numbers 4 and 5 to the control input 122" of the dematrixing unit 120". The dematrixing unit 120' receives the two compatible signals $L_0$ and $R_0$ and the first, second and third auxiliary signals and generates the signals LS, $S_l$, $S_r$, $S_c$ and RS in response to the selection control signal supplied to the control signal input 122'. The dematrixing unit 120" receives the signals $S_l$, $S_r$ and $S_c$, as supplied by the dematrixing unit 120', as well as the fourth and fifth auxiliary signals and generates the signals LL, LC, CC, RC and RR in response to the selection control signal supplied to the control signal input 122".

FIG. 11 shows a prior art 5-channel decoder apparatus of the MPEG-2 type, for decoding the transmission signal. The decoder apparatus has an input for receiving the transmission signal generated by the encoder described above, thus including signal portions of seven signals. The transmission signal is supplied to a demultiplexer unit 132, after having carried out a channel decoding step, which is the inverse of the channel encoding step carried out in the encoder. As the transmission signal is backwards compatible, as will be explained later, the demultiplexer unit 132 is capable of retrieving the first five signal components, that is: the data compressed compatible signals $L_0$ and $R_0$, and the data compressed first, second and third auxiliary signals from the serial datastream and supplies the data reduced compatible signal $L_0$ to an output 134.1, the data reduced compatible signal $R_0$ to an output 134.2 and the first, second and third data reduced auxiliary signals to outputs 134.3 to 134.5 respectively. The demultiplexer thus ignores the data reduced fourth and fifth auxiliary signals included in the serial datastream. Further, the demultiplexer unit 132 retrieves the selection signals, denoted with encircled numbers 1, 2 and 3, from the serial datastream and supplies the selection signals to an output 136. Again, the demultiplexer ignores the selection signals denoted with encircled numbers 4 and 5 and included in the serial datastream. The outputs 134.1 to 134.5 are coupled to inputs of respective data expansion units 138.1 to 138.5. At the outputs of the expansion units 138.1 to 138.5, replicas of the original signals applied to the data compression units 80, 82, 86.1, 86.2 and 86.3 become available and are supplied to respective inputs of a dematrixing unit 140. The selection signals retrieved by the demultiplexer 132 are supplied to a control input 142 of the dematrixing unit 140, so as to dematrix the signals applied to its inputs 144.1 to 144.5 into the replicas of the original signals LS, $S_l$, $S_c$, $S_r$ and RS.

FIG. 12 shows a prior art 2-channel decoder apparatus of the MPEG-1 type for decoding the transmission signal. The decoder apparatus has an input for receiving the transmission signal generated by the encoder described above, thus including signal portions of seven signals. The transmission signal is supplied to a demultiplexer unit 152, after having carried out a channel decoding step, which is the inverse of the channel encoding step carried out in the encoder. As the transmission signal is backwards compatible, as will be explained later, the demultiplexer unit 152 is capable of retrieving the data compressed compatible signals $L_0$ and $R_0$ from the serial datastream and supplies the data reduced compatible signal $L_0$ to an output 154.1 and the datareduced compatible signal $R_0$ to an output 154.2 respectively. The demultiplexer thus ignores the data reduced first to fifth auxiliary signals included in the serial datastream. Further, the demultiplexer unit 152 ignores the selection signals. The outputs 154.1 and 154.5 are coupled to inputs of respective data expansion units 158.1 and 158.5. At the outputs of the expansion units 158.1 and 158.5, replicas of the original compatible signals $L_0$ and $R_0$ applied to the data compression units 80 and 82 become available.

FIG. 13 shows an example of the sequence in which the seven signal components are included in the transmission signal. FIG. 13 shows schematically a frame F of information. The frame F comprises first, second and third frame portions FP1, FP2 and FP3 respectively. The first frame portion FP1 comprises a header portion, denoted HDR, and a data portion, denoted DP1. The data portion DP1 comprises so-called MPEG-1 information. This is the subband information discussed in document (3), such as allocation information, scale factors and quantized samples of a left and right hand signal component of a stereo signal. In terms of the signals described above, the compatible signals $L_0$ and $R_0$ are stored after data compression by the above described encoder in this dataportion DP1. The second frame portion FP2 comprises a header portion, denoted EXTHDR, and a data portion DP2. The data portion DP2 is meant for storing additional data. In terms of the signals described above, a block of information comprising data of the first, second and third data reduced auxiliary signals is stored in this data portion DP2. This is denoted in FIG. 13 as MPEG-2 info. The third frame portion FP3 comprises a header portion, also denoted EXTHDR, and a data portion DP3. The data portion DP3 is meant for storing additional data. In terms of the signals described above, a block of information comprising data of the data reduced fourth and fifth auxiliary signals is included in said data portion DP3, see FIG. 13. The header portion EXTHDR of the second frame portion FP2 comprises a first identifier, identifying the data in the data portion DP2 as MPEG-2 information. Said in a different way: the first identifier identifies the information comprised in the data portion DP2 as information corresponding to the data compressed first, second and third auxiliary signals. The header portion of the second frame portion FP2 further comprises the selection signals denoted earlier by the encircled numbers 1, 2 and 3. The header portion EXTHDR of the third frame portion FP3 comprises a second identifier, identifying the data in the data portion DP3 as the 7-channel extension information. Said in a different way: the second identifier identifies the information comprised in the data portion DP3 as information corresponding to the data compressed fourth and fifth auxiliary signals. The header portion of the third frame portion FP3 further comprises the selection signals denoted earlier by the encircled numbers 4 and 5.

The frame shown in FIG. 13 may or may not fit in a frame as defined in the documents (3) or (9), dependent of the number of bits that need to be stored in the frame of FIG. 13. If it does not fit, the overload portion will be stored in a separate stream, as defined in document (10).

A prior art MPEG-1 stereo decoder, such as described in document (3) will recognize the information stored in the first frame portion FP1 as being stereo information and supply the replicas of the two compatible signals $L_0$ and $R_0$ at its output. The MPEG-1 decoder will ignore the data contained in the frame portions FP2 and FP3 as, if it tries to decode this information, it will recognize the information as ancillary data, not being audio data. A prior art MPEG-2 5-channel decoder, such as described in the documents (2) and (8), will recognize the information stored in the frame portion FP1 and the MPEG-2 information stored in the frame portion FP2 as being a 5-channel information stream and supply the replicas of the signals LS, $S_l$, $S_c$, $S_r$ and RS to its outputs. The MPEG-2 decoder will ignore the data contained in the frame portion FP3 as, if it tries to decode this information, it will recognize the information as ancillary data, not being audio data. The above described 7-channel decoder is capable of recognizing the complete datastream and recover the replicas of the seven original signals LS, LL, LC, CC, RC, RR and RS.

The encoder apparatus can be used in an arrangement for storing the signal supplied by the encoder apparatus on a storage medium, such as a record carrier. FIG. 14 schematically shows such a storage arrangement in the form of a recording arrangement. The block denoted by 190 is the encoder apparatus described above. The block denoted by 191 can be a channel encoder, if the channel encoder is not incorporated in the combining unit 88. In the channel encoder, the signal applied to its input 192 is encoded in, as an example a Reed-Solomon encoder, and an interleaver, so as to enable an error correction to be carried out in the receiver. Further, again as an example, an 8-to-10 modulation well known in the art, see document (5) in the list of references, is carried out. The signal thus obtained is recorded in one track or a multiplicity of tracks on a record carrier 193, such as a magnetic or optical record carrier, by means of writing means 194, such as a magnetic or optical head 195. The storage medium may alternatively be a solid state memory.

An arrangement for retrieving the information from the storage medium is shown in FIG. 15. FIG. 15 shows an arrangement for reproducing the transmission signal from the above record carrier. A channel decoding must be carried out on the reproduced information which is inverse to the channel encoding during recording. That is: a 10-to-8 reconversion must be carried out, followed by an error correction and a de-interleaving. This is followed by the decoder apparatus shown in FIG. 10 or 10a. FIG. 15 show blocks 194', 191' and 190' that realize signal processing activities which are the inverse of the signal processing activities in the blocks 194, 191 and 190 respectively of the arrangement of FIG. 14.

Some additional features will be described now, that may be added to the encoder apparatus. Suppose that, during a certain time interval a mono surround signal is applied to the encoder apparatus. That is: LS=RS. The encoder apparatus may be provided with a switch which can be actuated by the user. If the user knows that the 7-channel signal applied to the encoder apparatus has a mono surround component, he can switch the encoder apparatus into a mono-surround transmission mode. In this mono-surround transmission mode, the encoder apparatus connects the inputs 1 and 7 together. Further, during selection, the encoder apparatus selects only two auxiliary signals from a first group of four signals, which are the signals LS, $S_l$, $S_r$ and $S_c$ and selects two signals from the second group of signals LL, LC, CC, RC and RR. Note that the second selection is as usual, but that one auxiliary signal less is selected in the first selection. Further, a flag indicating the mono-surround situation is generated and transmitted in the transmission signal so as to indicate to the decoder apparatus that it should switch itself to a mono-surround decoding mode.

The encoder apparatus could have been provided with a detector to detect a mono-surround situation by monitoring the signals LS and RS and to switch the encoder apparatus into the mono-surround encoding mode automatically, upon detection of such mono-surround situation.

Suppose now that the surround signals LS and RS are absent. The encoder apparatus now switches into a no-surround encoding mode, either upon a manual activation or upon detection by means of an internal detector. During selection, the encoder apparatus now selects only one auxiliary signal from a first group of three signals, which are the signals $S_l$, $S_r$ and $S_c$ and selects two signals from the second group of signals LL, LC, CC, RC and RR. Note that the second selection is again as usual, but that now only one auxiliary signal is selected in the first selection. Further, another flag indicating the no-surround situation is generated and transmitted in the transmission signal so as to indicate to the decoder apparatus that it should switch itself to a no-surround decoding mode.

Suppose now that the centre signal CC is absent. The encoder apparatus now switches into a no-centre signal encoding mode, either upon a manual activation or upon detection by means of an internal detector. During selection, $v_1$ and $v_2$ both being non zero, the encoder apparatus now selects only one auxiliary signal from the group of signals LL, LC, RC and RR. If v=0, the encoder apparatus now selects only one auxiliary signal from the group of signals LL and LC. If $v_2$=0, the encoder apparatus now selects only one auxiliary signal from the group of signals RR and RC. If $v_1=v_2=0$, the encoder apparatus now selects one auxiliary signal from the group of signals LL and LC and one auxiliary signal from the group of signals RR and RC. Again another flag signal is transmitted in order to switch the decoder apparatus into a no-centre signal decoding mode.

Whilst the present invention has been described with respect to preferred embodiments thereof, it is to be understood that these are not limitative examples. Thus, various modifications may become apparent to those skilled in the art, without departing from the scope of the invention, as defined by the claims. As an example, the invention has been described using wideband digital information signals LS, LL, LC, CC, RC, RR and RS. It should however be noted that the signals LS, LL, LC, CC, RC, RR and RS described and discussed above, are each only one and the same subband signal derived from seven wideband signals, where the measures in accordance with the invention, as described above, is applied to the signals in each subband separately. Reference is made in this respect to document (8). The invention thus lies in a specific encoding of a 7-channel signal into a data reduced transmission signal, such that a corresponding 7-channel decoder is capable of decoding the transmission signal into the original 7-channel signal, that a prior art MPEG-2 5-channel decoder is capable of decoding the transmission signal into a compatible 5-channel signal and a prior art MPEG-1 stereo decoder is capable of decoding the transmission signal into a compatible stereo signal. It should further be noted that the invention is not restricted to the use of MPEG-encoding schemes, but that also other data compression techniques, such as transform encoding may be applied.

Further, the invention lies in each and every novel feature or combination of features as herein disclosed.

List of related documents

| (1a) | J. A. E. S., Vol. 40, No. 5, May 1992, pp. 376–382, |
| (1b) | 'Matrixing of bitrate reduced audio signals' by W. R. Th. ten Kate et al, in Proc. of the ICASSP, 1992, March 23–26, San Francisco, Vol. 2, pp. II-205 to II-208. |
| (2) | US patent application Ser. No. 08/427,646 (PHQ 93-002) |
| (3) | European Patent Application no. 402,973 (PHN 13.241). |
| (4) | European patent Application no. 497,413A1 (PHN 13.581) |
| (5) | US Pat. No. 4,620,311 (PHN 11.117). |
| (6) | European Patent Application no. 400,755 (PHQ 89.018A). |
| (7a) | European Patent Application no. 457,390 (PHN 13.328). |
| (7b) | European Patent Application no. 457,391 (PHN 13.329). |
| (8) | EP 678,226-A1 and US Ser. No. 08/328,999 (PHN 14.615) |
| (9) | ISO/IEC international standard IS 11172-3, Information technology - coding of moving pictures and associated audio for digital storage media up to about 1.5 Mbit/s, Part 3: audio. |
| (10) | ISO/IEC international standard IS 13818-3, Information technology - coding of moving pictures and associated audio, Part 3: audio. |

We claim:

1. Apparatus for encoding a plurality of digital information signals, comprising:

first input means for receiving a first digital information signal, second input means for receiving a second digital information signal, third input means for receiving a third digital information signal, fourth input means for receiving a fourth digital information signal, fifth input means for receiving a fifth digital information signal, sixth input means for receiving a sixth digital information signal, seventh input means for receiving a seventh digital information signal, matrixing means for generating a first and a second digital composite signal from the first to seventh digital information signals, the matrixing means including:

first signal combination means for combining the second and third digital information signal and being adapted to generate a first combination signal, second signal combination means for combining the fifth and sixth digital information signal so as to obtain a second combination signal, third signal combination means for combining the third, fourth and fifth digital information signals so as to obtain a third combination signal, fourth signal combination means for combining the first digital information signal and the first and third combination signal so as to obtain the first composite signal, and fifth signal combination means for combining the seventh digital information signal and the second and third combination signal so as to obtain the second composite signal, the apparatus further comprising;

first and second data compression means for data compressing the first and second composite signal so as to obtain first and second data reduced digital composite signals, selection means for selecting one signal from a first group of five information signals so as to obtain a first auxiliary signal, the first group of five information signals including the first and seventh digital information signals and the first, second and third combination signals, for selecting another one of the first group so as to obtain a second auxiliary signal and again another one of the first group so as to obtain a third auxiliary signal, the selection means further being adapted to select one signal from a second group of five information signals so as to obtain a fourth auxiliary signal, the second group of five signals including the second to sixth digital information signals and to select another one of the second group so as to obtain a fifth auxiliary signal, third, fourth, fifth, sixth and seventh data compression means for data compressing the first, second, third, fourth and fifth auxiliary signal respectively so as to obtain first, second, third, fourth and fifth data reduced auxiliary signals respectively, and formatting means for combining the first and second data reduced composite signals and the first, second, third, fourth and fifth data reduced auxiliary signals into a transmission signal suitable for transmission via a transmission medium.

2. Apparatus as claimed in claim 1, further comprising calculation means for calculating an amount of data reduction to be achieved with at least two of the first to seventh data reduction means dependent of which of the three signals from the first group of five signals have been chosen as the first to third auxiliary signals and which of the two signals from the second group of five signals have been chosen as the fourth and fifth auxiliary signals, the calculation means further being adapted to establish those selections of three signals from the first group of five signals and two signals from the second group of five signals that result in the largest amount of data reduction to be achieved and to generate a selection control signal in response thereto, the selection means being adapted to receive the selection control signal and to select three signals from the first group of five signals and two signals from the second group of five signals in response to the selection control signal.

3. Apparatus as claimed in claim 2, the calculation means being further adapted to calculate the amount of data reduction to be achieved with the first to seventh data reduction means dependent of which of the three signals from the first group of five signals have been chosen as the first to third auxiliary signals and which of the two signals from the second group of five signals have been chosen as the fourth and fifth auxiliary signals, the calculation means further being adapted to establish those selections of three signals from the first group of five signals and two signals from the second group of five signals that result in the largest amount of data reduction to be achieved and to generate the selection control signal in response thereto.

4. Apparatus as claimed in claim 2, the calculation means being further adapted to calculate the amount of data reduction to be achieved with the third to seventh data reduction means dependent of which of the three signals from the first group of five signals have been chosen as the first to third auxiliary signals and which of the two signals from the second group of five signals have been chosen as the fourth and fifth auxiliary signals, the calculation means further being adapted to establish those selections of three signals from the first group of five signals and two signals from the second group of five signals that result in the largest amount of data reduction to be achieved and to generate the selection control signal in response thereto.

5. Apparatus as claimed in claim 2, wherein the formatter means is further adapted to combine the selection control signal into the transmission signal.

6. Apparatus as claimed in claim 1, wherein a signal combination means is adapted to multiply a first input signal received via a first input with a first multiplication value, to multiply a second input signal received via a second input with a second multiplication value and to add the multiplied versions of the first and second input signals.

7. Apparatus as claimed in claim 6, the signal combination means including first and second multiplier units, for multiplying the first and the second input signals with the first and second multiplication value respectively, wherein:

if one of the first and second multiplication values equals zero, the corresponding multiplier unit is dispensed with, and if one of the first and second multiplication values equals unity, the corresponding multiplier unit is in the form of an interconnection.

8. Apparatus as claimed in claim 1, wherein the third signal combination means is adapted to multiply the third digital information signal with a first multiplication value, to multiply the fourth digital information signal with a second multiplication value, to multiply the fifth digital information signal with a third multiplication value and to add the multiplied versions of the third, fourth and fifth digital information signals so as to obtain the third combination signal.

9. Apparatus as claimed in claim 8, the third combination means including first, second and third multiplier units, for multiplying an input signal with the first, second and third multiplication value respectively, wherein:

if one of the first, second and third multiplication values equals zero, the corresponding multiplier unit is dispensed with, and if one of the first, second and third multiplication values equals unity, the corresponding multiplier unit is in the form of an interconnection.

10. Apparatus as claimed in claim 1, wherein the apparatus further comprises: first, second, third, fourth and fifth data expansion means coupled to the third, fourth, fifth, sixth and seventh data compression means respectively, for carrying out an expansion step so as to obtain replicas of the first, second, third, fourth and fifth auxiliary signals respectively, one of the replicas of the first, second and third auxiliary signals being supplied to the fourth signal combination means instead of the first information signal, if the one auxiliary signal is the first information signal, one of the replicas of the first, second and third auxiliary signals being supplied to the fourth signal combination means instead of the first combination signal, if the one auxiliary signal is the first combination signal, one of the replicas of the first, second and third auxiliary signals being supplied to the fourth signal combination means and the fifth combination means instead of the third combination signal, if the one auxiliary signal is the third combination signal, one of the replicas of the first, second and third auxiliary signals being supplied to the fifth signal combination means instead of the second combination signal, if the one auxiliary signal is the second combination signal, one of the replicas of the first, second and third auxiliary signals being supplied to the fifth signal combination means instead of the seventh information signal, if the one auxiliary signal is the seventh information signal, one of the replicas of the fourth and fifth auxiliary signals being supplied to the first signal combination means instead of the second information signal, if the one auxiliary signal is the second information signal, one of the replicas of the fourth and fifth auxiliary signals being supplied to the first and third signal combination means instead of the third information signal, if the one auxiliary signal is the third information signal, one of the replicas of the fourth and fifth auxiliary signals being supplied to the third signal combination means instead of the fourth information signal, if the one auxiliary signal is the fourth information signal, one of the replicas of the fourth and fifth auxiliary signals being supplied to the second and third signal combination means instead of the fifth information signal, if the one auxiliary signal is the fifth information signal, one of the replicas of the fourth and fifth auxiliary signals being supplied to the second signal combination means instead of the sixth information signal, if the one auxiliary signal is the sixth information signal.

11. Apparatus as claimed in claim 1, the formatting means being adapted to generate a transmission signal, the transmission signal including:

first blocks of information containing data corresponding to the data reduced first and second digital composite signal, second blocks of information containing data corresponding to the data reduced first, second and third auxiliary signals and third blocks of information containing data corresponding to the data reduced fourth and fifth auxiliary signals.

12. Apparatus as claimed in claim 11,
the transmission signal including a first selection control signal and a second selection control signal,
the first selection control signal indicating the selection of first, second and third auxiliary signals from the first group of five signals from which the three auxiliary signals have been selected,
the second selection control signal indicating the selection of fourth and fifth auxiliary signals from the second group of five signals from which the two auxiliary signals have been selected,
the formatting means being further adapted to store the first selection control signal in a second block of information and to store the second selection control signal in a third block of information.

13. Apparatus as claimed in claim 11, the formatter means further being adapted to generate an identifier for identifying the information contained in the third signal blocks and being adapted to store the identifier in the third signal blocks.

14. Apparatus as claimed in claim 1, further comprising writing means for writing the transmission signal into a storage medium, such as a record carrier.

15. A storage medium obtained with the apparatus as claimed in claim 11, having the transmission signal written in it, the transmission signal including:
first blocks of information containing data corresponding to the data reduced first and second digital composite signal,
second blocks of information containing data corresponding to the data reduced first,
second and third auxiliary signals and third blocks of information containing data corresponding to the data reduced fourth and fifth auxiliary signals.

16. A method of encoding a plurality of digital information signals, the method comprising the steps of:
receiving a first digital information signal,
receiving a second digital information signal,
receiving a third digital information signal,
receiving a fourth digital information signal,
receiving a fifth digital information signal,
receiving a sixth digital information signal,
receiving a seventh digital information signal,
matrixing means the first to seventh digital information signals for generating a first and a second digital composite signal, the matrixing step including the substeps of:
combining the second and third digital information signal for generating a first combination signal,
combining the fifth and sixth digital information signal so as to obtain a second combination signal,
combining the third, fourth and fifth digital information signals so as to obtain a third combination signal,
combining the first digital information signal and the first and third combination signal so as to obtain the first composite signal,
combining the seventh digital information signal and the second and third combination signal so as to obtain the second composite signal,
the method further comprising the steps of:
data compressing the first and second composite signal so as to obtain first and second data reduced digital composite signals,
selecting one signal from a first group of five information signals so as to obtain a first auxiliary signal, the first group of five information signals including the first and seventh digital information signals and the first, second and third combination signals, selecting another one of the first group so as to obtain a second auxiliary signal and again another one of the first group so as to obtain a third auxiliary signal, selecting one signal from a second group of five information signals so as to obtain a fourth auxiliary signal, the second group of five signals including the second to sixth digital information signals and selecting another one of the second group so as to obtain a fifth auxiliary signal,
data compressing the first, second, third, fourth and fifth auxiliary signal respectively so as to obtain first, second, third, fourth and fifth data reduced auxilairy signals respectively,
combining and formatting the first and second data reduced composite signals and the first, second, third, fourth and fifth data reduced auxiliary signals so as to obtain a transmission signal suitable for transmission via a transmission medium.

17. A method as claimed in claim 16, further comprising the step of writing the transmission signal into a storage medium, such as a record carrier.

18. Apparatus for decoding a transmission signal, received so as to obtain a plurality of digital information signals, comprising:
input means for receiving the transmission signal,
deformatting means for retrieving first and second data reduced composite signals and first, second, third, fourth and fifth data reduced auxiliary signals from the transmission signal,
first, second, third, fourth, fifth, sixth and seventh data expansion means for data expanding the first and second data reduced composite signals and the first, second, third, fourth and fifth data reduced auxiliary signal respectively so as to obtain first and second composite signals and first, second, third, fourth and fifth auxilairy signals respectively,
dematrixing means for generating first, second, third, fourth, fifth, sixth and seventh digital information signals from the first and the second digital composite signal and the first to fifth auxiliary signals, the dematrixing means including first dematrixing means adapted to receive the first and second composite signals and a plurality of auxiliary signals, for converting those signals into a plurality of combination signals and a plurality of M digital information signals, and including second dematrixing means adapted to receive the plurality of combination signals and a second plurality of auxiliary signals, for converting those signals into the remaining 7-M digital information signals, where M is an integer and M>0,
first output means for supplying the first digital information signal,
second output means for supplying the second digital information signal,
third output means for supplying the third digital information signal,
fourth output means for supplying the fourth digital information signal,
fifth output means for supplying the fifth digital information signal,
sixth output means for supplying the sixth digital information signal, seventh output means for supplying the seventh digital information signal.

19. Apparatus for decoding a transmission signal received so as to obtain a plurality of digital information signals, comprising:

input means for receiving the transmission signal, deformatting means for retrieving first and second data reduced composite signals and first, second, third, fourth and fifth data reduced auxiliary signals from the transmission signal;

first, second, third, fourth, fifth, sixth and seventh data expansion means for data expanding the first and second data reduced composite signals and the first, second, third, fourth and fifth data reduced auxiliary signal respectively so as to obtain first and second composite signals and first, second, third, fourth and fifth auxilairy signals respectively;

dematrixing means for generating first, second, third, fourth, fifth, sixth and seventh digital information signals from the first and the second digital composite signal and the first to fifth auxiliary signals;

first output means for supplying the first digital information signal;

second output means for supplying the second digital information signal;

third output means for supplying the third digital information signal;

fourth output means for supplying the fourth digital information signal;

fifth output means for supplying the fifth digital information signal;

sixth output means for supplying the sixth digital information signal;

seventh output means for supplying the seventh digital information signal;

the deformatting means further being adapted to retrieve a selection control signal from the transmission signal, the dematrixing means further being adapted to generate the first, second, third, fourth, fifth, sixth and seventh digital information signals from the first and the second digital composite signal and the first to fifth auxiliary signals, in response to the selection control signal.

20. Apparatus as claimed in claim 18, the first dematrixing means being adapted to receive the first and second composite signals and the first, second and third auxiliary signals and to convert those signals into the first and seventh information signals and first, second and third combination signals, the second dematrixing means being adapted to receive the fourth and fifth auxiliary signals and the first, second and third combination signals and to convert those signals into the second, third, fourth, fifth and sixth information signals.

21. Apparatus as claimed in claim 20, the dematrixing means further being adapted to retrieve first and second selection control Signals from the transmission signal, the first dematrixing means being adapted to convert the first and second composite signals and the first, second and third auxiliary signals into the first and seventh information signals and first, second and third combination signals, in response to the first selection control signal, the second dematrixing means being adapted to convert the fourth and fifth auxiliary signals and the first, second and third combination signals into the second, third, fourth, fifth and sixth information signals, in response to the second selection control signal.

22. Apparatus as claimed in claim 21, the apparatus being adapted for receiving a transmission signal including first blocks of information containing data corresponding to the data reduced first and second digital composite signal, second blocks of information containing data corresponding to the data reduced first, second and third auxiliary signals and third blocks of information containing data corresponding to the data reduced fourth and fifth auxiliary signals, the second signal blocks further containing the first selection control signal and third signal blocks containing the second selection control signal, the demultiplexer means further being adapted to retrieve a first selection control signal from a second signal block and a second selection control signal from a third signal block.

23. Apparatus for decoding a transmission signal received so as to obtain a plurality of digital information signals, comprising:

input means for receiving the transmission signal;

deformatting means for retrieving first and second data reduced composite signals and first, second, third, fourth and fifth data reduced auxiliary signals from the transmission signal;

first, second, third, fourth, fifth, sixth and seventh data expansion means for data expanding the first and second data reduced composite signals and the first, second, third, fourth and fifth data auxiliary signal respectively so as to obtain first and second composite signals and first, second, third, fourth and fifth auxilairy signals respectively;

dematrixing means for generating first, second, third, fourth, fifth, sixth and seventh digital information signals from the first and the second digital composite signal and the first to fifth auxiliary signals;

first output means for supplying the first digital information signal;

second output means for supplying the second digital information signal;

third output means for supplying the third digital information signal;

fourth output means for supplying the fourth digital information signal;

fifth output means for supplying the fifth digital information signal;

sixth output means for supplying the sixth digital information signal;

seventh output means for supplying the seventh digital information signal;

the apparatus further being adapted to receive a transmission signal including frames, a frame including a first block of information containing data corresponding to the data reduced first and second digital composite signal, a second block of information containing data corresponding to the data reduced first, second and third auxiliary signals, and a third block of information containing data corresponding to the data reduced fourth and fifth auxiliary signals, the third signal block containing an identifier for identifying the information contained in the third signal block.

24. Apparatus as claimed in claim 18, further comprising reading means for reading the transmission signal from a storage medium, such as a record carrier.

* * * * *